(12) United States Patent
Hara et al.

(10) Patent No.: US 11,079,863 B2
(45) Date of Patent: Aug. 3, 2021

(54) ELECTRONIC PEN

(71) Applicant: Wacom Co., Ltd., Saitama (JP)

(72) Inventors: Kazuo Hara, Saitama (JP); Yoshihisa Sugiyama, Saitama (JP); Ken Suzuki, Saitama (JP); Teppei Kanno, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/705,098

(22) Filed: Dec. 5, 2019

(65) Prior Publication Data

US 2020/0142507 A1    May 7, 2020

Related U.S. Application Data

(63) Continuation of application No. PCT/JP2018/011096, filed on Mar. 20, 2018.

(30) Foreign Application Priority Data

Jul. 6, 2017   (JP) .............................. JP2017-132611

(51) Int. Cl.
*G06F 3/0354*  (2013.01)
*G06F 3/038*  (2013.01)
*G06F 3/046*  (2006.01)
*G01L 5/1627*  (2020.01)
*G01L 5/161*  (2020.01)

(52) U.S. Cl.
CPC .......... *G06F 3/03545* (2013.01); *G01L 5/161* (2013.01); *G01L 5/1627* (2020.01); *G06F 3/0383* (2013.01); *G06F 3/046* (2013.01)

(58) Field of Classification Search
None
See application file for complete search history.

(56) References Cited

U.S. PATENT DOCUMENTS

| 4,896,543 A | 1/1990 | Gullman |
| 5,548,092 A | 8/1996 | Shriver |
| 9,322,732 B2 | 4/2016 | Marrota et al. |

(Continued)

FOREIGN PATENT DOCUMENTS

| JP | 2006-92410 A | 4/2006 |
| JP | 2010-164495 A | 7/2010 |

(Continued)

OTHER PUBLICATIONS

International Search Report, dated Jun. 5, 2018, for International Application No. PCT/JP2018/011096, 1 page.

*Primary Examiner* — Stephen T. Reed
(74) *Attorney, Agent, or Firm* — Seed IP Law Group LLP

(57) ABSTRACT

An electronic pen includes a tubular casing, a core body having an end that protrudes from opening in the casing, a strain generating body that receives a force applied to the core body, a plurality of strain sensitive elements arranged on a planar portion of the strain generating body, a control circuit that performs control based on a signal sensed using the plurality of strain sensitive elements, and an electrical conductor that extends in the axial direction of the casing and is electrically connected to a plurality of terminals of the plurality of strain sensitive elements. The plurality of strain sensitive elements is electrically connected to the control circuit via the electrical conductor.

15 Claims, 12 Drawing Sheets

(56) References Cited

U.S. PATENT DOCUMENTS

| | | | |
|---|---|---|---|
| 2017/0068339 A1* | 3/2017 | Zimmerman | G06F 3/0414 |
| 2017/0108950 A1* | 4/2017 | Clements | G06F 3/03545 |
| 2018/0101251 A1* | 4/2018 | Fujitsuka | G01L 1/14 |

FOREIGN PATENT DOCUMENTS

| | | |
|---|---|---|
| WO | 2017/010336 A1 | 1/2017 |
| WO | 2017/069944 A1 | 4/2017 |

\* cited by examiner

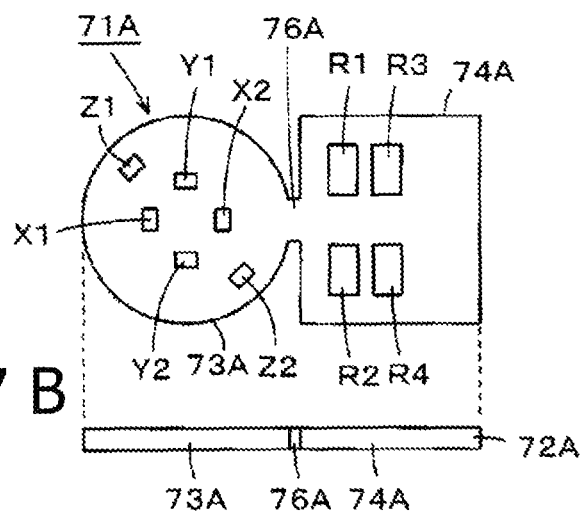

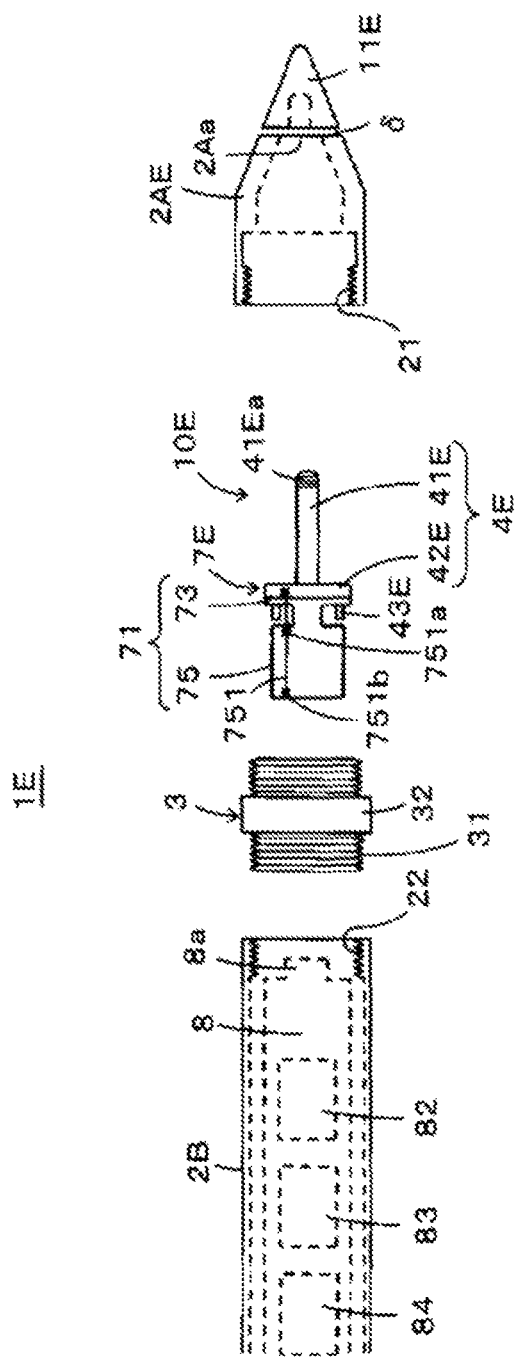
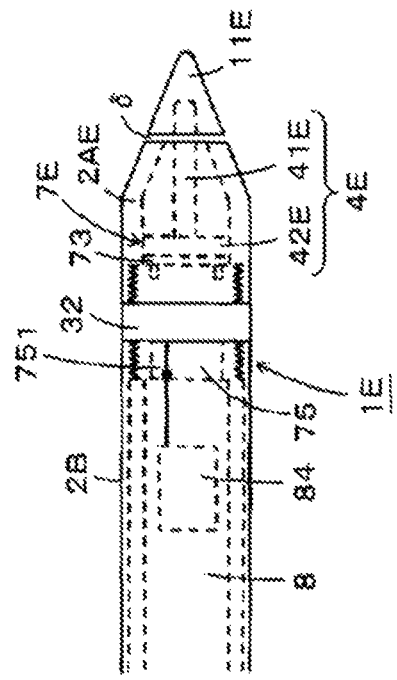
FIG. 8A
FIG. 8B

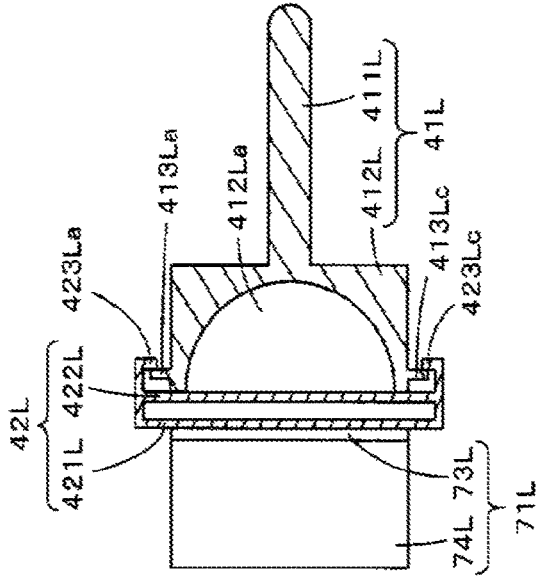
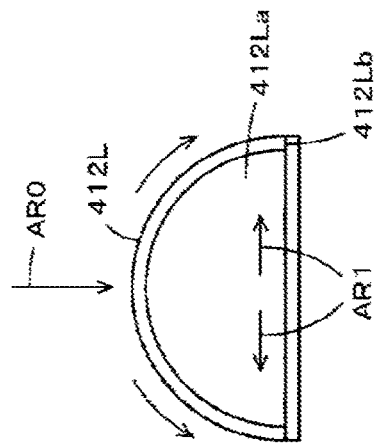
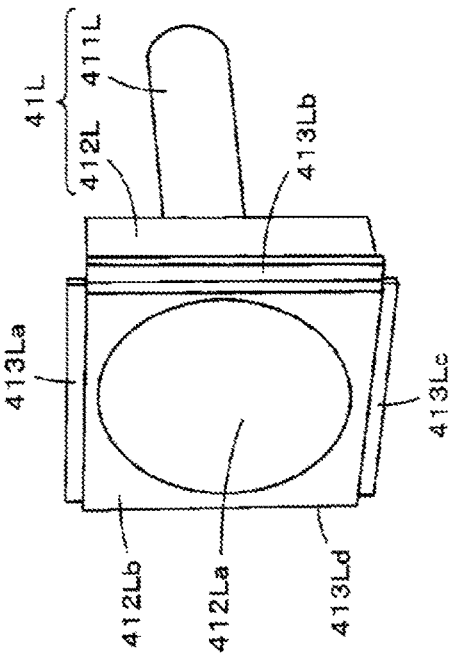

ELECTRONIC PEN

BACKGROUND

Technical Field

The present disclosure relates to an electronic pen used in conjunction with a position detecting device including a position detecting sensor.

Background Art

Many electronic pens of this kind have a pressure sensor for detecting contact with an input surface of the position detecting sensor and a pressure (pen pressure) at the time of the contact. The configuration of the pressure sensor often uses a variable capacitance capacitor having a configuration in which a dielectric is structurally sandwiched between two electrodes, and a capacitance between the two electrodes changes according to the pen pressure, a variable capacitance capacitor formed by a semiconductor device, or the like. However, the use of a strain gauge has also been proposed (see U.S. Pat. Nos. 5,548,092 and 9,322,732).

The strain gauge is a mechanical sensor (force detecting sensor) for measuring the strain of an object. A semiconductor strain gauge is often used in an electronic pen. The semiconductor strain gauge is a strain gauge that utilizes a piezoresistive effect in which the electric resistivity of a semiconductor changes according to stress or a piezoelectric effect in which polarization (surface charge) proportional to an applied pressure appears.

A so-called three-axis force detecting sensor has also been proposed as a pressure sensor using the strain gauge (see Japanese Patent Laid-Open No. 2010-164495 and U.S. Pat. No. 4,896,543).

In the strain gauge (semiconductor strain gauge, which will be referred to simply as a strain gauge in the following description), for example, strain sensitive elements change in resistance value according to strain are arranged on an insulating sheet, and output terminals of the strain gauge are formed on the insulating sheet.

A change in resistance of the strain gauge represents a minute value. Thus, a signal corresponding to a strain is obtained by using a bridge circuit such as a Wheatstone bridge circuit or the like in the force detecting sensor (force sensor).

In the case of using a strain gauge in an electronic pen, a small force detecting sensor using the strain gauge is desirable in recent electronic pens that have become increasingly thinner.

However, the conventional force detecting sensor using this kind of strain gauge is difficult to be miniaturized, and there is thus a fear of the casing of the electronic pen becoming thick.

BRIEF SUMMARY

The present disclosure has been made in view of the above points, and it is an object of the present disclosure to provide an electronic pen that makes it possible to achieve thinning and miniaturization of the electronic pen even when a three-axis force detecting sensor using a strain gauge is used.

In order to solve the above problems, according to the present disclosure, there is provided an electronic pen including: a tubular casing; a core body disposed within the tubular casing in a state in which an end of the core body protrudes out of the casing from an opening in a side of the casing in an axial direction of the casing; a strain generating body disposed within the tubular casing, the strain generating body having a planar portion formed in a direction orthogonal to the axial direction of the casing, wherein, in operation, a force applied to the core body is transmitted to the strain generating body; a plurality of strain sensitive elements arranged on the planar portion of the strain generating body; a control circuit which, in operation, performs control based on a signal sensed using the plurality of strain sensitive elements; and an electrical conductor that extends in the axial direction of the casing and is electrically connected to a plurality of terminals of the plurality of strain sensitive elements arranged on the planar portion of the strain generating body; the plurality of strain sensitive elements and the control circuit being electrically connected to each other via the electrical conductor.

According to the electronic pen in accordance with the present disclosure, the planar portion of the strain generating body is formed in the direction orthogonal to the axial direction of the casing of the electronic pen, and the plurality of strain sensitive elements is arranged on the planar portion of the strain generating body. The plurality of strain sensitive elements and the control circuit that performs control based on the signal sensed using the strain sensitive elements are electrically connected to each other via the electrical conductor that extends in the axial direction of the casing electrically connected to the plurality of terminals of the plurality of strain sensitive elements arranged on the planar portion of the strain generating body, and the strain generating body, the electrical conductor, and the control circuit are arranged in the axial direction of the casing of the electronic pen. The casing of the electronic pen can therefore be thinned.

BRIEF DESCRIPTION OF THE DRAWINGS

FIGS. 7A and 7B are diagrams of assistance in explaining of another example of the strain gauge used in the electronic pen according to the first embodiment;

FIGS. 8A and 8B are diagrams of assistance in explaining an example of a configuration of an electronic pen according to a second embodiment of the present disclosure;

FIGS. 13A, 13B, 13C, and 13D are diagrams of assistance in explaining another example of constituent parts used in an electronic pen according to an embodiment of the present disclosure;

DETAILED DESCRIPTION

A few embodiments of an electronic pen according to the present disclosure will hereinafter be described with reference to the drawings.

First Embodiment

Figure 1A:
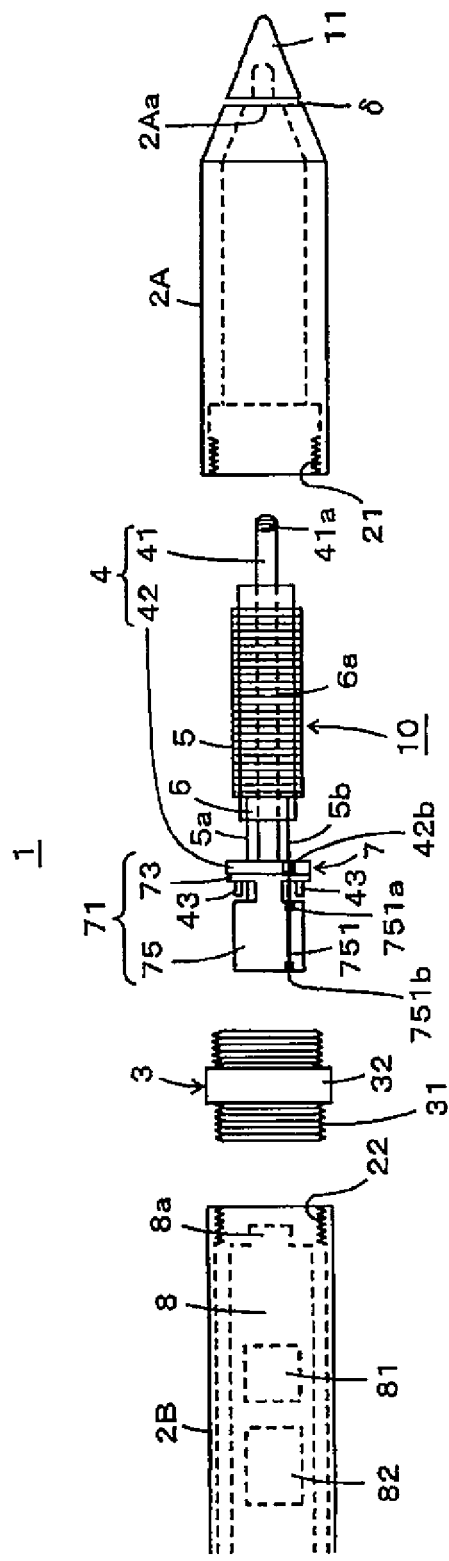
FIGS. 1A and 1B are diagrams of assistance in explaining an example of a configuration of an electronic pen according to a first embodiment of the present disclosure.
Figure 1B:
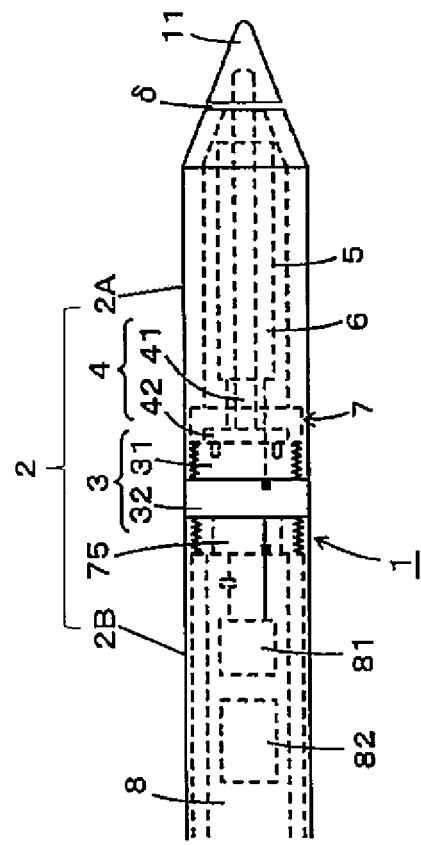

This first embodiment is an example in which the present disclosure is applied to an electromagnetic induction type of electronic pen. FIGS. 1A and 1B are of assistance in explaining an example of a configuration of an electronic pen 1 according to the present first embodiment of the present disclosure. FIG. 1A is a diagram depicting the electronic pen 1 disassembled into main parts. FIG. 1B is a diagram depicting a main section of the electronic pen 1 formed by assembling the main parts depicted in FIG. 1A.

The electronic pen 1 has a cylindrical casing 2 elongated in an axial direction of the casing 2 that is constituted of a cylindrical first case 2A and a cylindrical second case 2B. The casing 2 is, for example, formed of a resin or the like. As depicted in FIG. 1A, the cylindrical first case 2A and the cylindrical second case 2B of the casing 2 are separated from each other in the axial direction. Then, the first case 2A and the second case 2B are coupled to each other as depicted in FIG. 1B by a case coupling member 3 to form the casing 2. In the present example, the first case 2A is on a pen tip side of the electronic pen 1, and the second case 2B is on a pen rear end side of the electronic pen 1, which is an opposite side from the pen tip side.

Figure 2A:
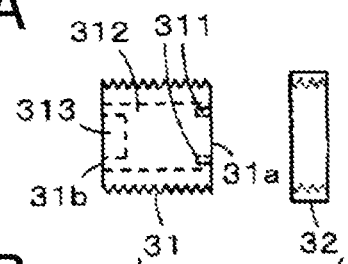
FIGS. 2A, 2B, and 2C are diagrams of assistance in explaining an example of constituent parts of the electronic pen according to the first embodiment of the present disclosure.

As depicted in FIG. 2A, the case coupling member 3 is constituted of a threaded member 31, in which a screw thread is formed on the outer circumferential side surface of a cylindrical member, and a ring member 32 screwed onto the threaded member 31. When the ring member 32 is screwed onto the threaded member 31, the ring member 32 and the threaded member 31 are coupled to each other to form the case coupling member 3. In this case, the position of the ring member 32 in the axial direction of the threaded member 31 can be adjusted arbitrarily.

As depicted in FIG. 1A, a threaded portion 21 screwed onto the threaded member 31 of the case coupling member 3 is formed on the inner wall surface of an opening portion of the first case 2A which opening portion is on a side coupled to the case coupling member 3. In addition, as depicted in FIG. 1A, a threaded portion 22 screwed onto the threaded member 31 of the case coupling member 3 is formed on the inner wall surface of an opening portion of the second case 2B which opening portion is on a side coupled to the case coupling member 3.

A pen module 10 is disposed within the casing 2. The pen module 10 in the present example includes a core body portion 4, a magnetic core 6 wound with a coil 5, a force detecting sensor 7, the case coupling member 3, and a printed board (circuit board) 8. In a state in which the pen module 10 is housed within the casing 2, as depicted in FIG. 1B, a part including the core body portion 4, the magnetic core 6 wound with the coil 5, and the force detecting sensor (force sensor) 7 of the pen module 10 is housed within the first case 2A, and the part of the printed board 8 of the pen module 10 is housed within the second case 2B.

Figure 3A:
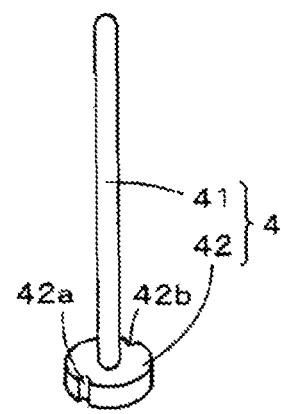
FIGS. 3A and 3B are diagrams of assistance in explaining an example of constituent parts of the electronic pen according to the first embodiment of the present disclosure.

The core body portion 4 in the present example is of a shape having a disk portion 42 on one end side of a thin rod-shaped body portion 41 as depicted in FIG. 3A. The core body portion 4 is, for example, formed by a hard resin such as polyoxymethylene (POM) or the like, special use stainless (SUS) steel, or the like. The rod-shaped body portion 41 and the disk portion 42 in the present example are formed integrally with each other.

The magnetic core 6 in the present example is a ferrite core. The magnetic core 6 has a cylindrical shape. A through hole 6a in the axial direction is provided at a center line position of the magnetic core 6. The rod-shaped body portion 41 of the core body portion 4 is inserted and fitted into the through hole 6a of the magnetic core 6, so that the magnetic core 6 wound with the coil 5 is locked to the rod-shaped body portion 41 of the core body portion 4.

The disk portion 42 of the core body portion 4 constitutes a strain generating body portion of the force detecting sensor 7. The force detecting sensor 7 includes the disk portion 42 constituting the strain generating body portion and a strain gauge 71. In the strain gauge 71 in the example depicted in FIGS. 4A and 4B, as will be described later, strain sensitive elements X1, X2, Y1, Y2, Z1, and Z2 and fixed resistances R1 and R2 and R3 and R4 constituting a part of a bridge circuit (see FIG. 5) are arranged on one same sheet-shaped base material 72 formed of an insulative film sheet, and further wiring patterns are formed on the sheet-shaped base material 72.

In the present embodiment, as depicted in FIGS. 3A and 3B and FIGS. 4A and 4B, the strain gauge 71 includes a force sensing portion 73 and an extending portion 74 and an extending portion 75 extending left and right from the force sensing portion 73. The force sensing portion 73 and the extending portion 74 and the extending portion 75 are formed by one sheet-shaped base material 72. The force sensing portion 73 and the extending portion 74 are coupled to each other via a coupling portion 76 configured to have bending easiness, and the force sensing portion 73 and the extending portion 75 are coupled to each other via a coupling portion 77 configured to have bending easiness.

The part of the force sensing portion 73 in the sheet-shaped base material 72 is formed in a circular shape having a diameter equal to the diameter of the disk portion 42 of the core body portion 4 or slightly smaller than the diameter of the disk portion 42. A surface side of the force sensing portion 73 in a circular shape on which surface side the strain sensitive elements X1, X2, Y1, Y2, Z1, and Z2 on the circular shape portion are not formed is bonded to a bottom surface of the disk portion 42 of the core body portion 4 which bottom surface is on an opposite side from the rod-shaped body portion 41 by, for example, affixing the surface side of the force sensing portion 73 to the bottom surface of the disk portion 42 by an adhesive. Thus, the force sensing portion 73 of the strain gauge 71 is fixed to the disk portion 42 of the core body portion 4, and the same strain as a strain occurring in the disk portion 42 of the core body portion 4 occurs in the force sensing portion 73, so that the strain sensitive elements X1, X2, Y1, Y2, Z1, and Z2 of the force sensing portion 73 can sense a force applied to the disk portion 42 via the rod-shaped body portion 41.

Figure 4A:
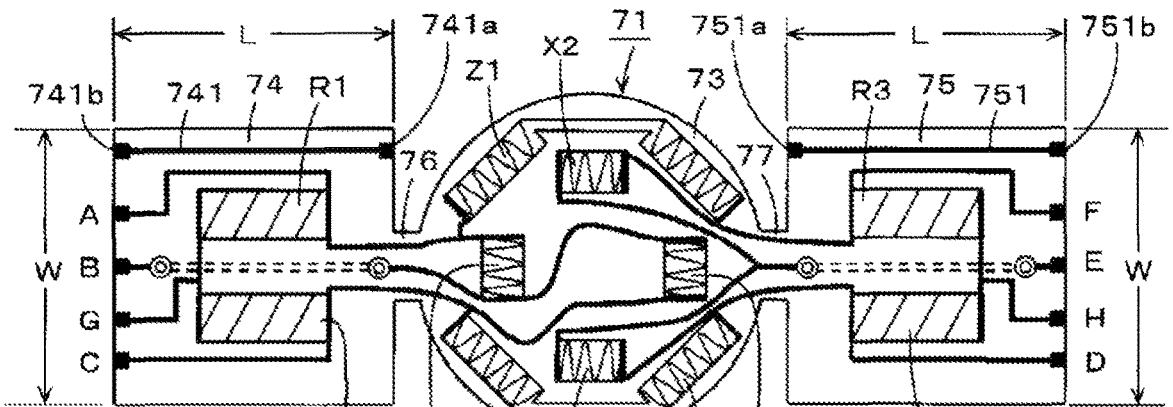
FIGS. 4A and 4B are diagrams of assistance in explaining an example of a strain gauge used in the electronic pen according to the first embodiment of the present disclosure.
Figure 4B:
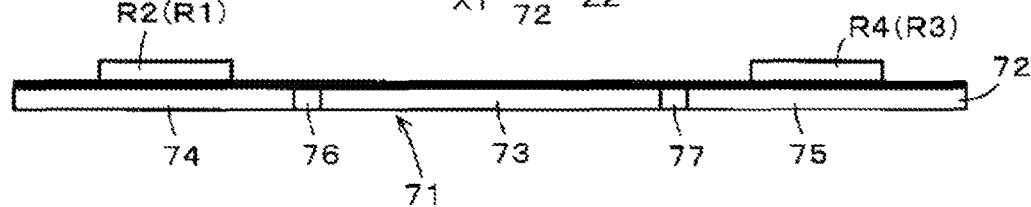

The parts of the extending portion 74 and the extending portion 75 in the sheet-shaped base material 72 in the present example are formed as rectangular parts extending left and right from the force sensing portion 73. As depicted in FIG. 4A, the extending portion 74 and the extending portion 75 in the present example are formed in a rectangular shape having a length L in an extending direction and having a width W orthogonal to the extending direction. In the present example, the length L and the width W in the extending direction of the extending portion 74 and the extending portion 75 are set in consideration of electronic parts and wiring patterns formed on the extending portion 74 and the extending portion 75. The width W of the extending portion 74 and the extending portion 75 in the example of FIGS. 4A and 4B is selected to be a value larger than the radius of the force sensing portion 73 and smaller than the diameter of the force sensing portion 73.

The width of the coupling portion 76 and the coupling portion 77 in a direction orthogonal to the extending direction is set to be a length shorter than the diameter of the force sensing portion 73 and shorter than the width W of the extending portion 74 and the extending portion 75 so that the extending portion 74 and the extending portion 75 have bending easiness, that is, are easily bent with respect to the force sensing portion 73. That is, in the present example, the coupling portion 76 and the coupling portion 77 form a constricted portion.

In the present embodiment, the extending portion 74 and the extending portion 75 in the present example can be easily bent in an orthogonal direction (axial direction of the electronic pen 1), that is, to the second case 2B side, at the parts of the coupling portion 76 and the coupling portion 77 with respect to the surface of the disk portion 42 to which surface the force sensing portion 73 is affixed. Therefore, respective terminal portions of the strain sensitive elements X1, X2, Y1, Y2, Z1, and Z2 of the force sensing portion 73 which strain sensitive elements are disposed on one surface of the disk portion 42 can be easily extended in the axial direction of the electronic pen 1 via the extending portion 74 and the extending portion 75.

Incidentally, while the width W of the extending portion 74 and the extending portion 75 in the direction orthogonal to the extending direction is assumed to be smaller than the diameter of the force sensing portion 73 in the example of FIGS. 3A and 3B and FIGS. 4A and 4B, the width W of the extending portion 74 and the extending portion 75 may be larger than the diameter of the force sensing portion 73.

In addition, when the bending easiness between the force sensing portion 73 and the extending portion 74 and between the force sensing portion 73 and the extending portion 75 can be maintained, the coupling portion 76 and the coupling portion 77 constituting a constricted portion as in the example of FIGS. 4A and 4B do not need to be provided. For example, the extending portion 74 and the extending portion 75 having the width W in the direction orthogonal to the extending direction may be continuously formed from the circular force sensing portion 73, and thereafter a slit or a notch along the circumference of the circular force sensing portion 73 may be formed at a coupling portion between the circular force sensing portion 73 and the extending portion 74 and a coupling portion between the circular force sensing portion 73 and the extending portion 75 in a state in which width portions equivalent to the coupling portion 76 and the coupling portion 77 in the example of FIGS. 4A and 4B are left.

As depicted in FIG. 4A, the strain sensitive elements X1, X2, Y1, Y2, Z1, and Z2 and wiring patterns are formed on a surface of the force sensing portion 73 which surface is on an opposite side from the surface bonded to the disk portion 42.

The strain sensitive elements X1 and X2 detect a strain in a first direction orthogonal to the axial direction of the rod-shaped body portion 41 of the core body portion 4 (which first direction will hereinafter be referred to as an X-axis direction), the strain occurring in the strain gauge 71 according to a force applied in the X-axis direction. The strain sensitive elements X1 and X2 are arranged at positions separated from the central position of the force sensing portion 73 in a circular shape by mutually equal distances in a direction corresponding to the X-axis direction.

In addition, the strain sensitive elements Y1 and Y2 detect a strain in a second direction that is a direction orthogonal to the axial direction of the rod-shaped body portion 41 of the core body portion 4 and is orthogonal to the X-axis direction (which second direction will hereinafter be referred to as a Y-axis direction), the strain occurring in the strain gauge 71 according to a force applied in the Y-axis direction. The strain sensitive elements Y1 and Y2 are arranged at positions separated from the central position of the force sensing portion 73 in a circular shape by mutually equal distances in a direction corresponding to the Y-axis direction.

In addition, the strain sensitive elements Z1 and Z2 detect a strain in a third direction as the axial direction of the rod-shaped body portion 41 of the core body portion 4 (which third direction will hereinafter be referred to as a Z-axis direction), the strain occurring in the strain gauge 71 according to a force applied in the Z-axis direction. In the present example, on the peripheral side of the arrangement positions of the strain sensitive elements X1 and X2 and Y1 and Y2, the strain sensitive elements Z1 and Z2 are arranged at positions shifted by 45 degrees from an X-axis formed by the strain sensitive elements X1 and X2 and a Y-axis formed by the strain sensitive elements Y1 and Y2 with a point of intersection of the X-axis and the Y-axis as a central point. Incidentally, the strain sensitive elements Z1 and Z2 are respectively formed by coupling two elements located in the vicinity of each other among four elements arranged at the positions shifted by 45 degrees from the X-axis and the Y-axis, and coupling the other two elements to each other. Wiring patterns extending from both ends of each of the strain sensitive elements X1, X2, Y1, Y2, Z1, and Z2 (which wiring patterns are represented by thick lines in FIG. 4A; the same applies hereinafter) are formed on the force sensing portion 73.

Figure 5:
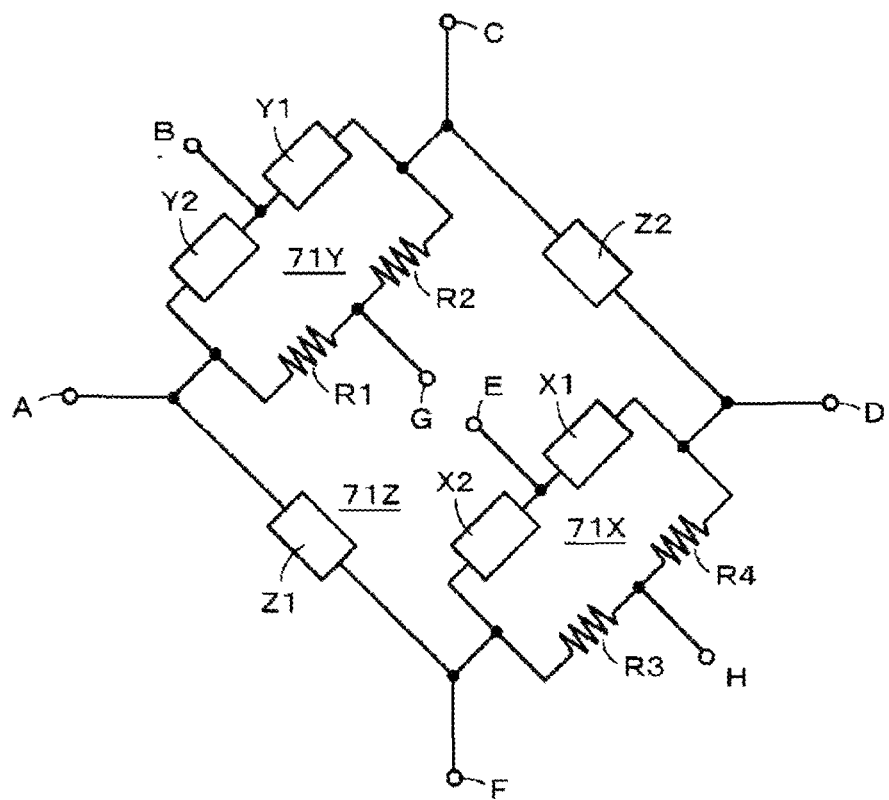
FIG. 5 is a diagram of assistance in explaining an example of an electronic circuit of the strain gauge used in the electronic pen according to the first embodiment of the present disclosure.

In the present embodiment, the strain gauge 71 detects strains in the X-axis direction, the Y-axis direction, and the Z-axis direction with high sensitivity by using a bridge circuit configuration. FIG. 5 is an example of a circuit diagram of the strain gauge 71 having a bridge circuit configuration.

As depicted in FIG. 5, a series circuit of the strain sensitive element X1 and the strain sensitive element X2 and a series circuit of the resistance R3 and the resistance R4 are connected in parallel with each other to form a bridge circuit 71X between a terminal D and a terminal F. A terminal E is led out from a connection midpoint between the strain sensitive element X1 and the strain sensitive element X2. A terminal H is led out from a connection midpoint between the resistance R3 and the resistance R4.

In addition, a series circuit of the strain sensitive element Y1 and the strain sensitive element Y2 and a series circuit of the resistance R1 and the resistance R2 are connected in parallel with each other to form a bridge circuit 71Y between a terminal A and a terminal C. A terminal B is led out from a connection midpoint between the strain sensitive element Y1 and the strain sensitive element Y2. A terminal G is led out from a connection midpoint between the resistance R1 and the resistance R2.

Further, the strain sensitive element Z1 and the strain sensitive element Z2 form a bridge circuit 71Z together with the bridge circuit 71X and the bridge circuit 71Y. That is, a series circuit of the strain sensitive element Z1 and the bridge circuit 71Y and a series circuit of the strain sensitive element Z2 and the bridge circuit 71X are connected in parallel with each other to form the bridge circuit 71Z between the terminal C and the terminal F. In this case, a connection midpoint between the strain sensitive element Z1 and the bridge circuit 71Y is the terminal A, and a connection midpoint between the strain sensitive element Z2 and the bridge circuit 71X is the terminal D.

In the present embodiment, the resistances R3 and R4, which are fixed resistance as circuit elements constituting the bridge circuit 71X together with the strain sensitive element X1 and X2, are arranged on the extending portion 75 of the strain gauge 71, and the resistances R1 and R2, which are fixed resistances constituting the bridge circuit 71Y together with the strain sensitive elements Y1 and Y2, are arranged on the extending portion 74.

In the present example, on the extending portion 74 and the extending portion 75, wiring patterns continuously connected to the wiring patterns extending from both ends of each of the strain sensitive elements X1, X2, Y1, Y2, Z1, and Z2 formed on the force sensing portion 73 are formed so as to constitute the bridge circuit depicted in FIG. 5. The terminals A, B, G, and C are formed as solder tabs at an end edge of the extending portion 74 which end edge is on an opposite side from the force sensing portion 73, and the terminals F, E, H, and D are formed as solder tabs at an end edge of the extending portion 75 which end edge is on an opposite side from the force sensing portion 73.

Incidentally, in this case, the wiring patterns are formed on the extending portion 74 and the extending portion 75, and a pad for attaching each of the resistances R1, R2, R3, and R4 is formed on the extending portion 74 and the extending portion 75. Each of the resistances R1, R2, R3, and R4 is attached to the formed pad by, for example, soldering each of the resistances R1, R2, R3, and R4 to the formed pad. In FIG. 4A, wiring patterns indicated by dotted lines represent parts wired on an undersurface side via through holes indicated by double-circle symbols.

Further, in the present embodiment, as depicted in FIG. 4A, conductor patterns 741 and 751 for connection between each of a winding start terminal 5a and a winding end terminal 5b of the coil 5 and an electronic circuit on the printed board disposed on the second case 2B side, which electronic circuit will be described later, are formed on the extending portion 74 and the extending portion 75 of the strain gauge 71.

Figure 2B:
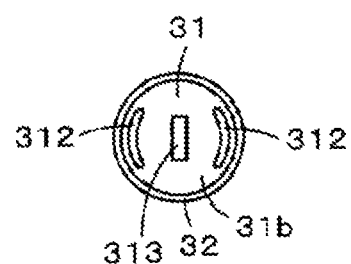
Figure 2C:
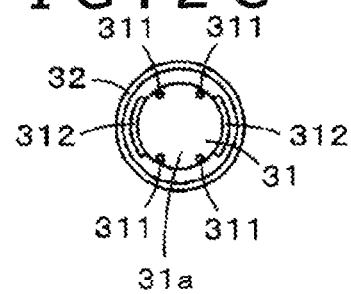

In the present example, four leg portions 43 are formed on the surface of the disk portion 42 to which surface the force sensing portion 73 of the strain gauge 71 is affixed. On the other hand, as depicted in FIGS. 2A and 2C, four recessed holes 311 into which to fit the four leg portions 43 of the disk portion 42 of the core body portion 4 are formed in an end surface 31a of the threaded member 31 of the case coupling member 3 which end surface is on the first case 2A side. In addition, as depicted in FIGS. 2B and 2C, arcuate through holes 312 extending over an angle range corresponding to the length of the width W (see FIG. 4A) in the direction orthogonal to the extending direction of the extending portions 74 and 75 from the force sensing portion 73 are formed in the threaded member 31 of the case coupling member 3 so as to correspond to the extending portion 74 and the extending portion 75 of the strain gauge 71.

In a state in which the force sensing portion 73 of the strain gauge 71 is affixed and attached to the disk portion 42, the disk portion 42 of the core body portion 4 is fixed to the threaded member 31 of the case coupling member 3 by fitting the leg portions 43 of the disk portion 42 of the core body portion 4 into the recessed holes 311, and bonding the disk portion 42 to the end surface 31a of the threaded member 31 by an adhesive.

In this case, before fixing the disk portion 42 of the core body portion 4 to the threaded member 31 of the case coupling member 3, as depicted in FIG. 1A, the winding start terminal 5a and the winding end terminal 5b of the coil 5 are, for example, soldered respectively to terminals 741a and 751a (see FIG. 4A) of the conductor patterns 741 and 751 formed on the extending portion 74 and the extending portion 75 of the strain gauge 71. Incidentally, as depicted in FIG. 1A and FIG. 3A, slits 42a and 42b in the axial direction are formed in an outer circumferential portion of the disk portion 42 of the core body portion 4. Thus, respective covered lines of the winding start terminal 5a and the winding end terminal 5b of the coil 5 are housed within the slits 42a and 42b at a time of connection to the conductor patterns 741 and 751 of the extending portion 74 and the extending portion 75 of the strain gauge 71. The covered lines therefore do not protrude to the outside of the diameter of the disk portion 42.

Further, the extending portion 74 and the extending portion 75 of the strain gauge 71 are inserted into the arcuate through holes 312 of the threaded member 31, and are projected on a side of the threaded member 31 of the case coupling member 3 which side is to be coupled to the second case 2B. In this case, the length L (see FIG. 4A) in the extending direction of the extending portion 74 and the extending portion 75 of the strain gauge 71 is selected to be larger than the length in the axial direction of the threaded member 31 of the case coupling member 3. Thus, in a state in which the disk portion 42 of the core body portion 4 is fixed to the threaded member 31 of the case coupling member 3, the extending portion 74 and the extending portion 75 of the strain gauge 71 penetrate the threaded member 31, and project to the printed board 8 side within the second case 2B.

A capacitor 81 connected to the above-described coil 5 to constitute a resonance circuit is provided on the printed board 8, and a control circuit (integrated circuit (IC)) 82 for controlling the whole of the electronic pen 1 according to the present embodiment and other circuit constituent elements are formed on the printed board 8. As will be described later, the control circuit 82 is configured to be able to detect components in the X-axis direction, the Y-axis direction, and the Z-axis direction of a force applied to the core body portion 4.

A protruding portion 8a is formed on an end portion of the printed board 8 which end portion is on the case coupling member 3 side, and as depicted in FIGS. 2A and 2B, a recessed hole 313 into which to fit the protruding portion 8a of the printed board 8 is formed in an end surface 31b of the threaded member 31 of the case coupling member 3 which end surface is on the printed board 8 side.

The printed board 8 is locked to the case coupling member 3 by, for example, soldering and electrically connecting lead wires between the printed board 8 and the extending portion 74 and the extending portion 75 of the strain gauge 71, as will be described in the following, in a state in which the protruding portion 8a is fitted in the recessed hole 313 of the threaded member 31 of the case coupling member 3.

Specifically, conductor patterns connected to one electrode and another electrode of the capacitor 81 disposed on the printed board 8 are respectively connected to terminal portions 741b and 751b of the conductor patterns 741 and 751 of the extending portion 74 and the extending portion 75 of the strain gauge 71 via lead wires, for example. In addition, the above-described terminals A to H of the strain gauge 71 are connected via lead wires to conductor patterns connected to corresponding terminals of the control circuit 82 disposed on the printed board 8.

Connection is thus established by soldering the lead wires between the terminals A to H and the terminal portions 741b and 751b of the conductor patterns 741 and 751, the terminals A to H and the terminal portions 741b and 751b being formed at edge portions of the extending portion 74 and the extending portion 75 of the strain gauge 71 which extending portions penetrate the threaded member 31 of the case coupling member 3 and project to the second case 2B side, and the corresponding conductor pattern parts of the printed board 8. Consequently, the printed board 8 and the strain gauge 71 are electrically connected to each other, and the printed board 8 is coupled to the case coupling member 3. The electric connection between the printed board 8 and the strain gauge 71 may also be made by a method such as connector connection, ACF compression bonding, or the like.

As described above, the pen module 10 is constructed by fixing the disk portion 42 of the core body portion 4 to which the strain gauge 71 is attached to the threaded member 31 of the case coupling member 3, and connecting and coupling the printed board 8 to the extending portion 74 and the extending portion 75 of the strain gauge 71. Incidentally, it is obvious that the connection of the extending portion 74 and the extending portion 75 of the strain gauge 71 to the printed board can also be made by a method such as connector connection, Advanced Compression Fitting (ACF) compression bonding, or the like rather than soldering the lead wires as in the above-described example.

The electronic pen 1 is constructed by screwing the first case 2A onto the threaded member 31 of the case coupling member 3 of the pen module 10 constructed as described above in a state in which the core body portion 4, the magnetic core 6 wound with the coil 5, and a part of the force detecting sensor 7 are housed within the first case 2A, and screwing the second case 2B onto the threaded member 31 of the case coupling member 3 in a state in which the printed board 8 and a part of the force detecting sensor 7 are housed within the second case 2B.

An opening portion 2Aa is formed in a front end portion of the first case 2A so as to protrude a front end portion of the rod-shaped body portion 41 of the core body portion 4. In the present embodiment, as depicted in FIG. 1A, a threaded portion 41a is formed on the front end portion of the rod-shaped body portion 41 of the core body portion 4. As depicted in FIG. 1B, a pen tip member 11 is attached to the threaded portion 41a on the front end portion by being screwed onto the threaded portion 41a to constitute a pen tip portion.

In this case, a predetermined air gap δ is provided between an end surface of the first case 2A which end surface is on the opening portion 2Aa side and the pen tip member 11 in order to be able to transmit a force in the axial direction of the electronic pen 1 and a force in a direction intersecting the axial direction to the disk portion 42 via the rod-shaped body portion 41 of the core body portion 4 when the pen tip member 11 receives the forces, and set detection output of the strain gauge 71 to zero when no force is applied to the pen tip member 11.

In the present embodiment, the predetermined air gap δ is set such that the strain detection output of the strain gauge 71 is zero by adjusting the position in the axial direction of the ring member 32 of the case coupling member 3 with respect to the threaded member 31. Specifically, first, the first case 2A is attached to the case coupling member 3 of the pen module 10 by screwing the first case 2A to the case coupling member 3 of the pen module 10, and thereby a front end 41a of the rod-shaped body portion 41 of the core body portion 4 of the pen module 10 is made to protrude from the opening portion 2Aa of the first case 2A. Then, the pen tip member 11 is fixed to the front end 41a of the rod-shaped body portion 41 of the core body portion 4 which front end protrudes from the opening portion 2Aa of the first case 2A by screwing the pen tip member 11 onto the front end 41a of the rod-shaped body portion 41 of the core body portion 4. At this time, the first case 2A is securely coupled to the case coupling member 3 by screwing the first case 2A such that the first case 2A abuts against the ring member 32 as depicted in FIG. 1B while adjusting the position in the axial direction of the ring member 32 of the case coupling member 3 with respect to the threaded member 31 such that the predetermined gap δ is formed between the end surface of the first case 2A which end surface is on the opening portion 2Aa side and the pen tip member 11 and such that the strain detection output of the strain gauge 71 is thereby set to zero.

After the first case 2A is coupled to the case coupling member 3 by screwing the first case 2A to the case coupling member 3 such that the predetermined gap δ is thus formed between the end surface of the first case 2A which end surface is on the opening portion 2Aa side and the pen tip member 11, the second case 2B is coupled to the threaded member 31 of the case coupling member 3 by screwing the second case 2B to the threaded member 31 of the case coupling member 3 in a state in which the printed board 8 of the pen module 10 is housed within a hollow portion of the second case 2B, as depicted in FIG. 1B. Then, though not depicted, an opening of the second case 2B which opening is on an opposite side from the case coupling member 3 side is closed by a lid member. The electronic pen 1 is thereby completed.

Example of Electronic Circuit Configuration and Example of Operation of Electronic Pen 1

Figure 6:
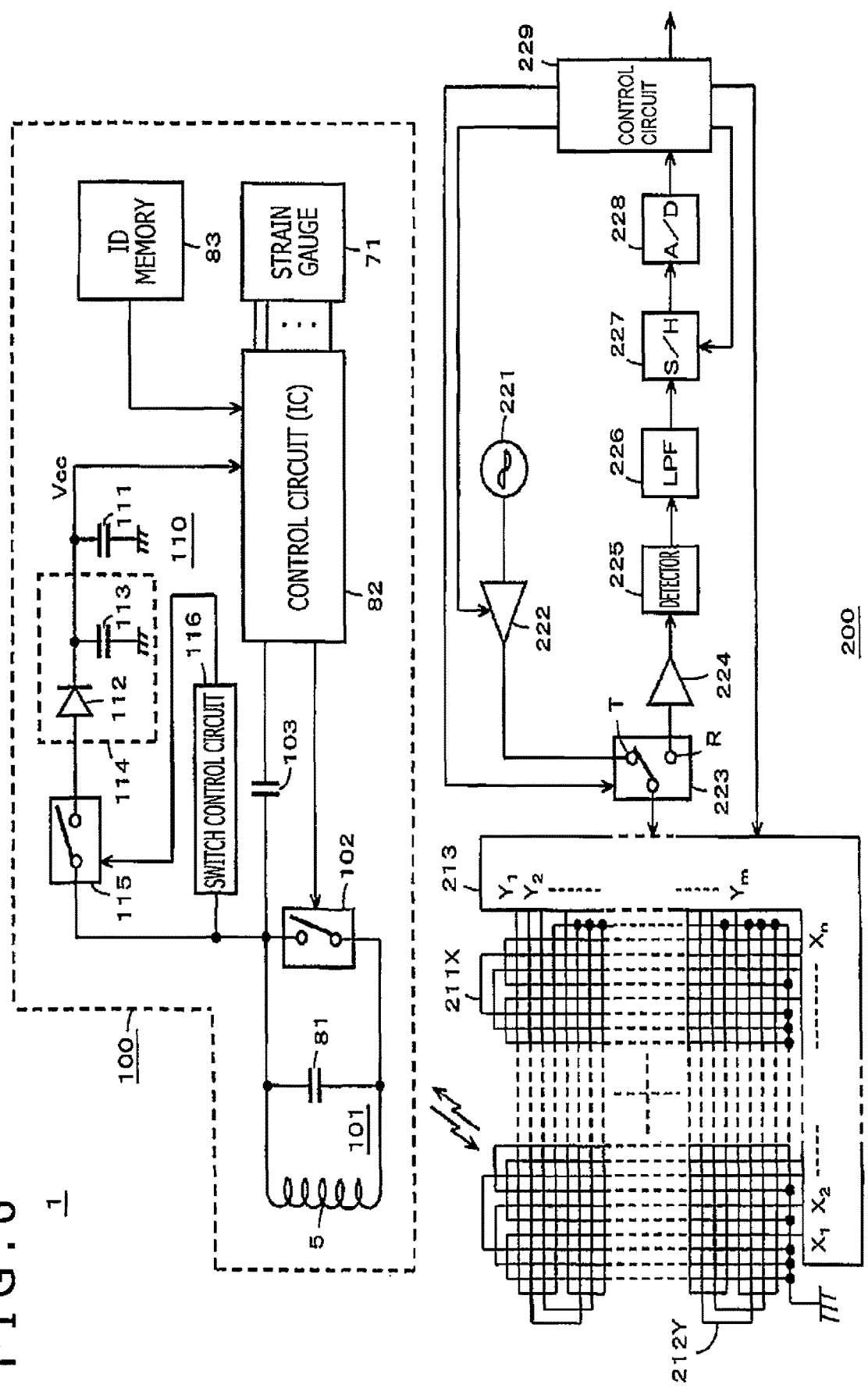
FIG. 6 is a block diagram of assistance in explaining an example of an electronic circuit of the electronic pen according to the first embodiment of the present disclosure and an example of a circuit of a position detecting device.

FIG. 6 is a diagram depicting an example of an electronic circuit 100 of the electronic pen 1 according to the present embodiment together with an example of circuit configuration of a position detecting device 200 that sends and receives signals to and from the electronic pen 1 by electromagnetic induction coupling. The electronic pen 1 according to the present embodiment is configured to send and receive position detection signals by electromagnetic induction coupling to conductors of a sensor of the position detecting device 200, and transmit, to the position detecting device 200, three axial direction components of a force applied to the core body portion 4, the three axial direction components being detected by the control circuit 82 on the basis of the output of the force detecting sensor 7 including the strain gauge 71, and identification information (ID) of the electronic pen 1 itself.

Specifically, in the electronic circuit 100 of the electronic pen 1, a parallel resonance circuit 101 is formed by connecting the capacitor 81 formed on the printed board 8 in parallel with the coil 5 wound around the magnetic core 6.

As depicted in FIG. 6, the electronic circuit 100 includes: the control circuit 82 described above; the strain gauge 71; a power supply voltage generating circuit 110; a switch circuit 102 for controlling generation of additional information to be transmitted to the position detecting device 200 in a state of being added to a position detection signal; and an ID memory 83.

An IC constituting the control circuit 82 is configured to operate on power Vcc obtained from an electric double layer capacitor 111 as an example of storage means provided to the power supply voltage generating circuit 110. In the power supply voltage generating circuit 110, an alternating-current signal received from the position detecting device 200 by electromagnetic coupling in the parallel resonance circuit 101 is rectified by a rectifier circuit 114 constituted of a diode 112 and a capacitor 113, and electricity is stored in the electric double layer capacitor 111 as a charging circuit.

In the present example, a switch circuit 115 normally set in an open state (normally open) is provided between the parallel resonance circuit 101 and the rectifier circuit 114. The switch circuit 115 is formed by a semiconductor switch circuit, for example. The switch circuit 115 has a high impedance in the open state.

The switch circuit 115 is controlled to be turned on by a switch control signal from a switch control circuit 116. The switch control circuit 116 generates the switch control signal from the alternating-current signal received from the position detecting device 200 by electromagnetic coupling in the parallel resonance circuit 101. That is, when the electronic pen 1 approaches the position detecting device 200 and is set in a state of receiving the alternating-current signal from the position detecting device by electromagnetic coupling, the switch control circuit 116 turns on the switch circuit 115 to charge the electric double layer capacitor 111 of the power supply voltage generating circuit 110.

Incidentally, while the rectifier circuit 114 in the example of FIG. 6 is a half-wave rectifier circuit, it is obvious that the rectifier circuit 114 may be a full-wave rectifier circuit. In addition, the power supply of the control circuit 82 formed by an IC may of course be a battery rather than storage means such as the electric double layer capacitor 111 in the present example.

In addition, in the electronic circuit 100, the above-described switch circuit 102 is connected in parallel with the parallel resonance circuit 101 formed by the coil 5 and the capacitor 81. The switch circuit 102 is configured to be subjected to on-off control by the control circuit 82. As a synchronizing signal for sending and receiving electromagnetic induction signals to and from the position detecting device 200, an electromagnetic induction signal transmitted from the position detecting device 200 is supplied to the control circuit 82 via a capacitor 103.

Hence, the control circuit 82 of the electronic pen 1 can determine whether the electronic pen 1 is in a state of being electromagnetically coupled to the position detecting device 200 by detecting the electromagnetic induction signal of the synchronizing signal for sending and receiving electromagnetic induction signals, the electromagnetic induction signal being transmitted from the position detecting device 200. When the control circuit 82 determines that the electronic pen 1 is not electromagnetically coupled to the position detecting device 200, the control circuit 82 sets the switch circuit 102 in an off state at all times, and thereby sets the parallel resonance circuit 101 in an operating state. When the control circuit 82 determines that the electronic pen 1 is electromagnetically coupled to the position detecting device 200, the control circuit 82 transmits additional information to the position detecting device 200 by performing on-off control of the switch circuit 102 in transmission timing of the additional information, as will be described later.

The control circuit 82 is connected with the terminals A to H of the strain gauge 71. As described above, the control circuit 82 has a function of detecting forces applied on three axes in the X-axis direction, the Y-axis direction, and the Z-axis direction of the electronic pen 1 by using the circuit of FIG. 5 described above in the strain gauge 71. Description will be made of an operation of detecting forces in the three axial directions by using the circuit of FIG. 5 in the strain gauge 71.

In the strain gauge 71, the respective resistance values of the resistances R1, R2, R3, and R4 are set such that a signal balance is achieved in each of the bridge circuits 71X, 71Y, and 71Z when no force is applied to the rod-shaped body portion 41 of the core body portion 4 and thus no strain occurs in the disk portion 42. Therefore, when the control circuit 82 applies a predetermined input voltage between the terminal C and the terminal F, for example, a potential difference between the terminal A and the terminal D is zero (bridge circuit 71Z), a potential difference between the terminal B and the terminal G is zero (bridge circuit 71Y), and a potential difference between the terminal E and the terminal H is zero (bridge circuit 71X).

When a force is applied to the pen tip portion of the electronic pen, that is, to the pen tip member 11 fitted to the rod-shaped body portion 41 of the core body portion 4, a component in the X-axis direction of the applied force causes a strain in an extending direction on one side of the central position of the disk portion 42 and causes a strain in a contracting direction on the other side of the central position in the X-axis direction of the disk portion 42 via the rod-shaped body portion 41. Therefore, the resistance values of the strain sensitive element X1 and X2 of the force sensing portion 73 of the strain gauge 71 change, the signal balance of the bridge circuit 71X is lost, and consequently a potential difference occurs between the terminal E and the terminal H.

Similarly, a component in the Y-axis direction of the force applied to the pen tip member 11 causes a strain in an extending direction on one side of the central position of the disk portion 42 and causes a strain in a contracting direction on the other side of the central position in the Y-axis direction of the disk portion 42 via the rod-shaped body portion 41. Therefore, the resistance values of the strain sensitive elements Y1 and Y2 of the force sensing portion 73 of the strain gauge 71 change, the signal balance of the bridge circuit 71Y is lost, and consequently a potential difference occurs between the terminal B and the terminal G.

Similarly, due to a component in the Z-axis direction of the force applied to the pen tip member 11, the resistance values of the strain sensitive elements Z1 and Z2 of the force sensing portion 73 of the strain gauge 71 change, the signal balance of the bridge circuit 71Z is lost, and consequently a potential difference occurs between the terminal A and the terminal D.

The control circuit 82 detects the forces applied in the respective directions of the three axes on the basis of the potential differences between the respective terminals described above. Then, the control circuit 82 transmits detection information of the force in the Z-axis direction as pen pressure data to the position detecting device 200, and transmits, to the position detecting device 200, the forces in the X-axis direction and the Y-axis direction as forces for detection of an inclination angle of the electronic pen 1 with respect to the input surface of the position detecting device. In the present embodiment, the control circuit 82 transmits the information on the detected forces in the respective directions of the three axes as a digital signal of a plurality of bits to the position detecting device 200 by performing on-off control of the switch circuit 102. In the present embodiment, the information on the detected forces in the respective direction of the three axes constitutes a part of the additional information sent from the electronic pen 1 to the position detecting device 200.

In addition, as depicted in FIG. 6, in the present embodiment, the ID memory 83 storing identification information (ID) including a manufacturer number and a product number of the electronic pen 1 is disposed on the printed board 8. The ID memory 83 is connected to the control circuit 82. The control circuit 82 reads the identification information stored in the ID memory 83, and transmits the identification information as a digital signal of a plurality of bits to the position detecting device 200 by performing on-off control of the switch circuit 102. In the present embodiment, the identification information also constitutes a part of the additional information.

When the control circuit 82 receives a synchronizing signal from the position detecting device 200 through the capacitor 103, the control circuit 82 transmits the information on the forces in the respective directions of the three axes and the identification information as an amplitude shift keying (ASK) modulated signal to the position detecting device 200 by performing on-off control of the switch circuit 102 in timing based on the synchronizing signal. Incidentally, instead of the ASK modulation, modulation into an on off keying (OOK) signal may be performed.

As depicted in FIG. 6, in the position detecting device 200, position detecting coils are formed by stacking an X-axis direction loop coil group 211X and a Y-axis direction loop coil group 212Y. The loop coil groups 211X and 212Y are, for example, constituted of n and m rectangular loop coils, respectively. The loop coils forming the respective loop coil groups 211X and 212Y are disposed so as to be arranged at equal intervals and sequentially overlap each other. Incidentally, the X-axis direction and the Y-axis direction in the position detecting coils and the X-axis direction and the Y-axis direction of the forces detected by the strain gauge 71 of the electronic pen 1 are not mutually related, but are simply used to represent the position coordinate axes in the two axial directions orthogonal to each other and the forces in the three axial directions orthogonal to each other.

In addition, the position detecting device 200 is provided with a selecting circuit 213 to which the X-axis direction loop coil group 211X and the Y-axis direction loop coil group 212Y are connected. The selecting circuit 213 sequentially selects one loop coil of the two loop coil groups 211X and 212Y.

The position detecting device 200 further includes an oscillator 221, a current driver 222, a switching connecting circuit 223, a receiving amplifier 224, a detector 225, a low-pass filter 226, a sample and hold circuit 227, an analog to digital (A/D) converter circuit 228, and a control circuit 229. The control circuit 229 is formed by a microcomputer, for example.

The oscillator 221 generates an alternating-current signal of a frequency f0. The resonance frequency of the parallel resonance circuit 101 of the electronic pen 1 is selected such that the frequency f0 is a center frequency. The alternating-current signal generated in the oscillator 221 is supplied to the current driver 222. The current driver 222 converts the alternating-current signal supplied from the oscillator 221 into a current, and sends out the current to the switching connecting circuit 223. The switching connecting circuit 223 selects a connection destination (a transmitting side terminal T or a receiving side terminal R) to which to connect the loop coil selected by the selecting circuit 213, under control of the control circuit 229. Of the connection destinations, the transmitting side terminal T is connected with the current driver 222, and the receiving side terminal R is connected with the receiving amplifier 224.

An induced voltage generated in the loop coil selected by the selecting circuit 213 is sent to the receiving amplifier 224 via the selecting circuit 213 and the switching connecting circuit 223. The receiving amplifier 224 amplifies the induced voltage supplied from the loop coil, and sends out the amplified induced voltage to the detector 225.

The detector 225 detects the induced voltage generated in the loop coil, that is, a received signal, and sends out the received signal to the low-pass filter 226. The low-pass filter 226 has a cutoff frequency sufficiently lower than the above-mentioned frequency f0. The low-pass filter 226 converts the output signal of the detector 225 into a direct-current signal, and sends out the direct-current signal to the sample and hold circuit 227. The sample and hold circuit 227 holds a voltage value of the output signal of the low-pass filter 226 in predetermined timing, specifically predetermined timing during a reception period, and sends out the voltage value to the A/D converter circuit 228. The A/D converter circuit 228 converts the analog output of the sample and hold circuit 227 into a digital signal, and outputs the digital signal to the control circuit 229.

The control circuit 229 controls the selection of a loop coil in the selecting circuit 213, the switching of the switching connecting circuit 223, and the timing of the sample and hold circuit 227. The control circuit 229 makes an electromagnetic induction signal transmitted from the X-axis direction loop coil group 211X and the Y-axis direction loop coil group 212Y for a certain transmission duration on the basis of the input signal from the A/D converter circuit 228.

An electromagnetic induction signal transmitted from the electronic pen 1 generates an induced voltage in each of the loop coils of the X-axis direction loop coil group 211X and the Y-axis direction loop coil group 212Y. The control circuit 229 calculates the coordinate values of an indicated position in an X-axis direction and a Y-axis direction which position is indicated by the electronic pen 1 on the basis of the level of the voltage value of the induced voltage generated in each loop coil.

In addition, the control circuit 229 supplies the current driver 222 with a signal for controlling interruption of a transmission signal and a signal for controlling the level of the transmission signal, and performs processing of receiving the additional information such as the information on the respective forces on the three axes and the identification information or the like from the electronic pen 1. As will be described later, the control circuit 229 detects an intermittent signal formed by an ASK signal from the electronic pen 1 as a digital signal of a plurality of bits, and thereby detects the additional information such as the information on the respective forces on the three axes and the identification information or the like.

[Operation Between Electronic Pen 1 and Position Detecting Device 200]

The position detecting device 200 transmits an alternating-current signal on the basis of processing control of the control circuit 229. Meanwhile, the control circuit 82 of the electronic pen 1 is operating on a power supply voltage Vcc from the electric double layer capacitor 111. In the electronic pen 1, however, when the alternating-current signal from the position detecting device 200 is not received by the parallel resonance circuit 101, the switch circuit 115 is off, and the electric double layer capacitor 111 is not charged. When the alternating-current signal from the position detecting device 200 is then received by the parallel resonance circuit 101, the switch circuit 115 is turned on, and the electric double layer capacitor 111 is charged (storage of electricity).

When the control circuit 82 of the electronic pen 1 according to the present embodiment does not receive the synchronizing signal from the position detecting device 200 through the capacitor 103, and determines that the electronic pen 1 is not electromagnetically coupled to the position detecting device 200, the control circuit 82 sets the switch circuit 102 in an off state, and thereby sets the parallel resonance circuit 101 in an operating state at all times.

Hence, at this time, the electronic pen 1 is capable of receiving the alternating-current signal from the position detecting device 200 in the parallel resonance circuit 101. When the electronic pen 1 then approaches the sensor of the position detecting device 200, the electronic pen 1 receives the alternating-current signal from the position detecting device 200 by electromagnetic induction coupling.

Then, the switch control circuit 116 of the electronic circuit 100 of the electronic pen 1 generates a switch control signal to turn on the switch circuit 115 from the alternating-current signal received from the sensor of the position detecting device 200. When the switch control signal turns on the switch circuit 115, the alternating-current signal received by the parallel resonance circuit 101 is rectified by the rectifier circuit 114, and the electric double layer capacitor 111 is charged (storage of electricity).

While the parallel resonance circuit 101 is in an operating state, the electronic pen 1 operates so as to receive the signal from the sensor of the position detecting device 200 in the parallel resonance circuit 101, and feed back the received signal to the sensor of the position detecting device 200. The position detecting device 200 detects a position indicated by the electronic pen 1 by receiving the fed-back signal from the electronic pen 1. When timing of receiving the additional information from the electronic pen 1 then arrives, the position detecting device 200 sends a synchronizing signal to the electronic pen 1 as described above.

The control circuit 82 of the electronic pen 1 generates, as the additional information, the identification information of the electronic pen 1 itself and the information values of the forces in the respective directions of the three axes which forces are detected by using the strain gauge 71 on the basis of the synchronizing signal from the position detecting device 200. The control circuit 82 then transmits the generated additional information from the electronic pen 1 to the position detecting device 200 by performing on-off control of the switch circuit 102 according to the digital value of the generated additional information.

In this case, when the switch circuit 102 is off, the parallel resonance circuit 101 can return an electromagnetic induction signal to the position detecting device 200 by a resonance operation in response to the alternating-current signal transmitted from the position detecting device 200. The loop coils of the position detecting device 200 receive the electromagnetic induction signal from the parallel resonance circuit 101 of the electronic pen 1. When the switch circuit 102 is on, on the other hand, the parallel resonance circuit 101 is inhibited from the resonance operation in response to the alternating-current signal from the position detecting device 200. Therefore, the electromagnetic induction signal is not returned from the parallel resonance circuit 101 to the position detecting device 200, and the loop coils of the position detecting device 200 do not receive the signal from the electronic pen 1.

In the present example, the control circuit 229 of the position detecting device 200 receives the additional information of a digital signal of a plurality of bits by performing the detection of the presence or absence of the signal received from the electronic pen 1 a number of times equal to the number of bits of the additional information.

Meanwhile, the control circuit 82 of the electronic pen 1 generates the digital signal of the plurality of bits corresponding to the additional information to be transmitted, and performs on-off control of the switch circuit 102 in synchronism with the transmission and reception of the electromagnetic induction signal to and from the position detecting device 200 according to the digital signal of the plurality of bits. For example, when a bit of the additional information is "0," the switch circuit 102 is turned on. Then, as described above, no electromagnetic induction signal is returned from the electronic pen 1 to the position detecting device 200. When a bit of the additional information is "1," on the other hand, the switch circuit 102 is turned off. Then, as described above, the electromagnetic induction signal is returned from the electronic pen 1 to the position detecting device 200.

Hence, the control circuit 229 of the position detecting device 200 can receive the additional information as the digital signal by performing the detection of the presence or absence of the signal received from the electronic pen 1 a number of times equal to the number of bits of the additional information.

Then, the position detecting device 200 analyzes the information on the forces in the respective directions of the three axes within the received digital signal. The position detecting device 200 can detect a pen pressure applied to the electronic pen 1 from the information on the force in the Z-axis direction, and detect the inclination angle of the electronic pen 1 with respect to the input surface of the position detecting device 200 from the information on the forces in the X-axis direction and the Y-axis direction.

Effects of Embodiment

As described above, in the electronic pen 1 according to the present embodiment, electric connection to the strain sensitive elements X1, X2, Y1, Y2, Z1, and Z2 is established by extending the terminal portions of the strain sensitive elements X1, X2, Y1, Y2, Z1, and Z2 of the force sensing portion 73, the strain sensitive elements being formed on one surface of the disk portion 42, in the axial direction of the electronic pen 1 via the extending portion 74 and the extending portion 75. The electronic pen 1 can be thinned because circuit elements constituting the bridge circuit, for example, the resistances R1, R2, R3, and R4, for example, can be housed in the axial direction of the electronic pen 1.

In the electronic pen 1 according to the foregoing embodiment, the pen module 10 is constructed by fixing the disk portion 42 of the core body portion 4 to which the strain gauge 71 is attached to the threaded member 31 of the case coupling member 3, and connecting and coupling the printed board 8 to the extending portion 74 and the extending portion 75 of the strain gauge 71. The electronic pen 1 can be constructed by merely screwing the first case 2A and the second case 2B to the threaded member 31 of the case coupling member 3 of the pen module 10. There is thus an effect in that the electronic pen 1 is suitable for mass production.

In order to surely transmit a force applied to the pen tip portion of the electronic pen 1 to the core body portion 4, the pen tip member 11 is provided to the front end portion of the rod-shaped body portion 41 of the core body portion 4, and adjustment is made so as to form a predetermined gap δ between the pen tip member and an end portion in the axial direction of the first case. There is an effect in that the adjustment can be made by forming the case coupling member 3 from the threaded member 31 and the ring member 32 and merely adjusting the position in the axial direction of the threaded member 31 of the ring member 32.

Modification of First Embodiment

In the description of the foregoing first embodiment, the strain gauge 71 is formed by extending the two extending portions 74 and 75 from the force sensing portion 73 affixed (or fixed) to the strain generating body. However, as depicted in FIGS. 7A and 7B, the connecting terminals of the strain sensitive elements X1, X2, Y1, Y2, Z1, and Z2 may be extended via one extending portion.

Specifically, also in a strain gauge 71A in the example of FIG. 7, as depicted in FIG. 7B, strain sensitive elements X1, X2, Y1, Y2, Z1, and Z2 and fixed resistances R1 and R2 and R3 and R4 constituting a part of a bridge circuit (see FIG. 5) are formed on one same sheet-shaped base material 72A. In the present example, however, the strain gauge 71A includes a force sensing portion 73A in a circular shape and one extending portion 74A coupled to the force sensing portion 73A via a coupling portion 76A formed in a similar manner to the coupling portion 76 of the strain gauge 71 in the first embodiment. As in the foregoing embodiment, the strain sensitive elements X1, X2, Y1, Y2, Z1, and Z2 and wiring patterns are formed on the force sensing portion 73A, and resistances R1, R2, R3, and R4, wiring patterns continuous from the force sensing portion 73A, terminals A to H for output, and conductor patterns used for establishing connection between a coil and a printed board are formed on the extending portion 74A.

In addition, though not depicted, the number of extending portions of the strain gauge 71 may be three or four as required. In the case of three extending portions, two resistances among the four resistances R1 to R4, for example, can be disposed on one of the three extending portions, and one resistance can be disposed on each of the other two extending portions. In addition, in the case of four extending portions, one resistance can be disposed on each of the extending portions.

Incidentally, it is obvious that the shape of the force sensing portion of the strain gauge is not limited to a circular shape, but can be made to be a shape conforming to the shape of the strain generating body.

In addition, while the strain generating body in the foregoing embodiment is the disk portion 42 formed integrally with the rod-shaped body portion 41 of the core body portion 4, the disk portion 42 and the rod-shaped body portion 41 may be separate members.

Second Embodiment

The electronic pen according to the first embodiment is an example in the case of the electromagnetic induction coupling type. However, it is obvious that the present disclosure is applicable also to an electronic pen of a capacitive coupling type. The second embodiment represents a case where the present disclosure is applied to an electronic pen of a capacitive coupling type, in particular a case of an electronic pen of a so-called active capacitive coupling type.

FIGS. 8A and 8B are diagrams of assistance in explaining an example of a configuration of parts of an electronic pen 1E according to a second embodiment of the present disclosure. In the configuration of the second embodiment, the configuration of a core body portion is different from the core body portion 4 in the first embodiment, and the configuration of an electronic circuit disposed on a printed board differs. However, the configuration of the second embodiment is otherwise similar to that of the first embodiment. Accordingly, in the electronic pen 1E according to the second embodiment, the same parts as in the first embodiment are identified by the same reference numerals, and detailed description thereof will be omitted.

A core body portion 4E of the electronic pen 1E according to the second embodiment is different from the core body portion 4 according to the first embodiment only in that the core body portion 4E of the electronic pen 1E according to the second embodiment is formed of a conductor material, and a rod-shaped body portion 41E and a disk portion 42E constituting a strain generating body portion are formed as an integral object as in the core body portion 4 in the first embodiment. In the second embodiment, a ferrite core and a coil are not necessary, and therefore the rod-shaped body portion 41E can be of a relatively short length. In addition, the case coupling member 3 is formed by screwing the ring member 32 onto the threaded member 31 as in the first embodiment.

A first case 2AE constituting a casing (case) of the second embodiment is different from the first case 2A of the electronic pen 1 according to the first embodiment only in that the first case 2AE has a reduced length in the axial direction so as to conform to the short length of the rod-shaped body portion 41E of the core body portion 4. The first case 2AE otherwise has a configuration similar to that of the first case 2A of the electronic pen 1 according to the first embodiment in that the first case 2AE, for example, has the threaded portion 21 screwed onto the threaded member 31 of the case coupling member 3 and an opening portion 2Aa for inserting the rod-shaped body portion 41E and protruding the rod-shaped body portion 41E to the outside. In the present embodiment, a pen tip member 11E screwed onto a front end portion 41Ea of the rod-shaped body portion 41E is formed by a conductor.

In addition, the second case 2B is formed in a substantially similar manner to that of the first embodiment, and the printed board 8 is housed within a hollow portion of the second case 2B. However, in the case of the second embodiment, the printed board 8 is not provided with the capacitor 81, but as depicted in FIG. 8A, the printed board 8 is provided with the control circuit 82 and the ID memory 83, and further provided with a signal transmitting circuit 84 that generates a signal to be sent out to the position detecting sensor of the position detecting device through the core body portion 4E.

In the second embodiment, a force detecting sensor 7E is formed by affixing the force sensing portion 73 of the strain gauge 71 depicted in FIG. 4 to the disk portion 42E of the core body portion 4E. The core body portion 4E is coupled to the case coupling member 3 in a state in which the extending portion 74 and the extending portion 75 of the strain gauge 71 are passed through the arcuate through hole 312 of the threaded member 31 of the case coupling member 3 (see FIGS. 2B and 2C), and are exposed to the printed board 8 side.

In the second embodiment, as depicted in FIG. 8A, one end 751a of the conductor pattern 751 of the extending portion 75 of the strain gauge 71 is electrically connected to the disk portion 42E formed of a conductor. In addition, another end 751b of the conductor pattern 751 of the extending portion 75 passed through the threaded member 31 of the case coupling member 3 and exposed on the printed board 8 side is electrically connected to a signal output terminal of the signal transmitting circuit 84 formed on the printed board 8. In addition, a plurality of leg portions 43E are formed to fix the disk portion 42E to the threaded member 31 of the case coupling member 3. Thus, a signal from the signal transmitting circuit 84 in the electronic pen 1E according to the second embodiment is sent out from the core body portion 4E and the pen tip member 11E to the outside.

Also in the present example, a pen module 10E is constructed by coupling the core body portion 4E to the case coupling member 3, coupling the printed board 8 to the case coupling member 3, and making electric connection. Then, as in the first embodiment, as depicted in FIG. 8B, the electronic pen 1E according to the second embodiment is constructed by screwing the first case 2AE and the second case 2B to the case coupling member 3, and attaching the pen tip member 11E to the front end of the core body portion 4E by screwing the pen tip member 11E onto the front end of the core body portion 4E.

Figure 9:
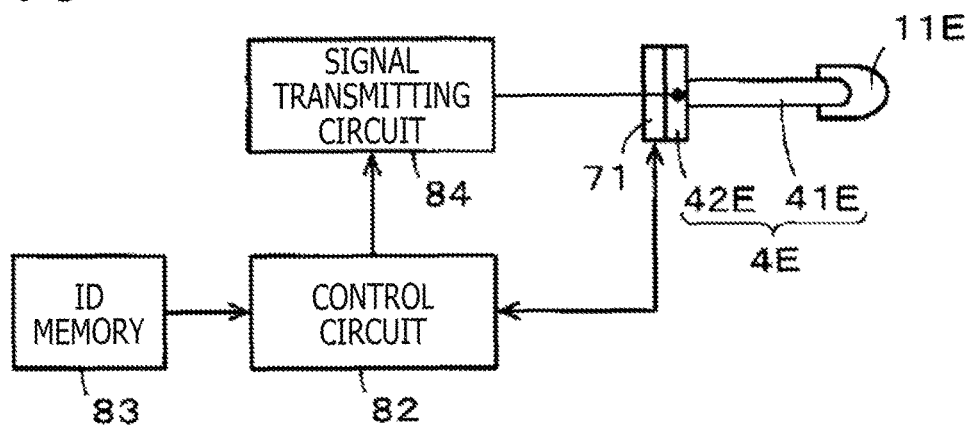
FIG. 9 is a block diagram depicting an example of an electronic circuit of the electronic pen according to the second embodiment of the present disclosure.

FIG. 9 depicts a configuration of an electronic circuit of the electronic pen 1E according to the second embodiment. As depicted in FIG. 9, the control circuit 82 makes a signal for position detection sent out through the core body portion 4E by controlling the signal transmitting circuit 84. The control circuit 82 detects information on forces in the respective directions of three axes with regard to a force applied to the pen tip member 11E on the basis of information received from the terminals A to H of the strain gauge 71. Then, the control circuit 82 performs control so as to send out the detected information on the forces in the respective directions of the three axes through the core body portion 4E by controlling the signal transmitting circuit 84. Further, the control circuit 82 reads the identification information of the electronic pen 1E from the ID memory 83, and performs control so as to send out the identification information through the core body portion 4E by controlling the signal transmitting circuit 84. In this case, the signal transmitting circuit 84 can transmit, to the position detecting device, additional information such as the information on the forces in the respective directions of the three axes and the identification information or the like as, for example, an ASK modulated signal, an OOK modulated signal, or the like as in the foregoing first embodiment.

Figure 10:
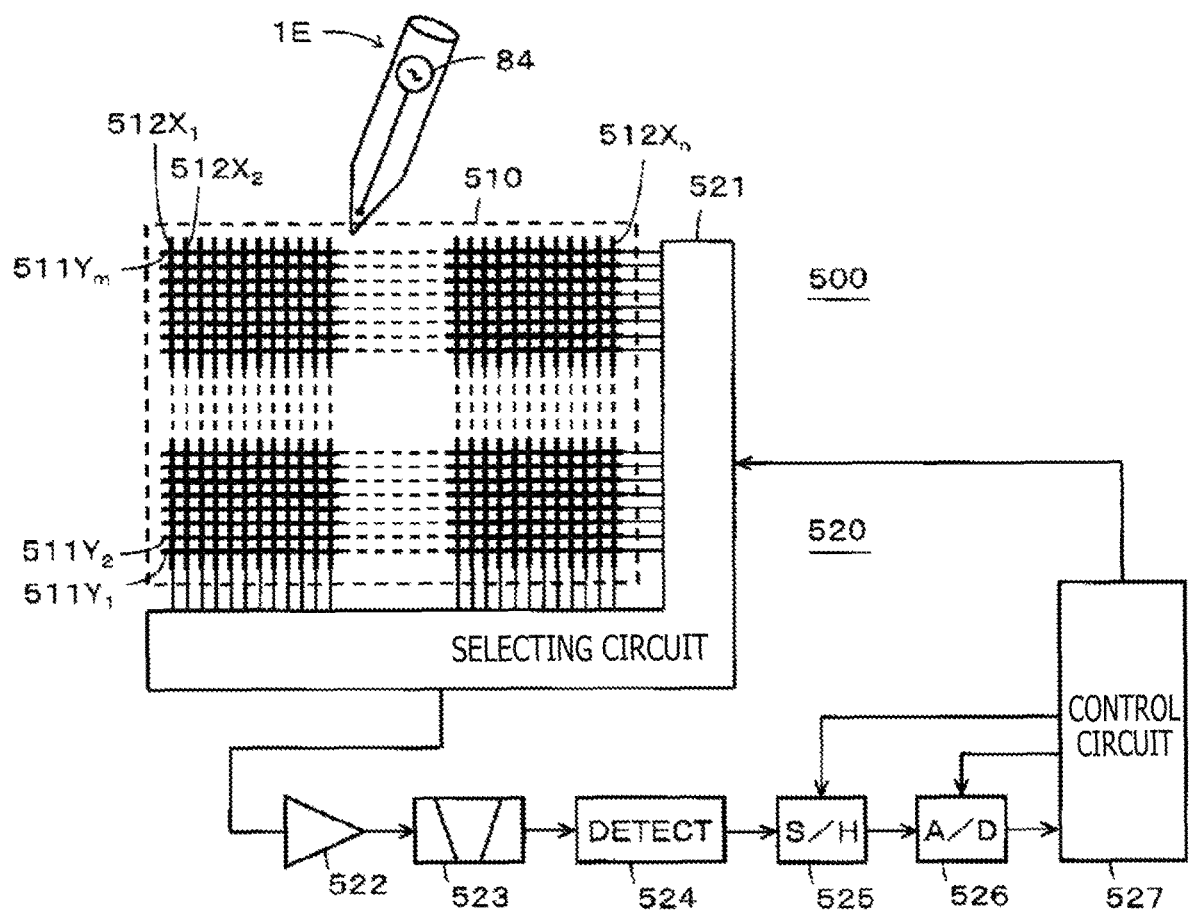
FIG. 10 is a block diagram depicting an example of a circuit configuration of a position detecting device used in conjunction with the electronic pen according to the second embodiment of the present disclosure.

FIG. 10 is a block diagram of assistance in explaining a position detecting device 500 using a capacitive coupling type coordinate detecting sensor that receives a signal from the electronic pen 1E and detects a position on the sensor, and detects the information on the forces in the respective directions of the three axes and the identification information described above.

As depicted in FIG. 10, the position detecting device 500 in the present example includes a capacitive coupling type coordinate detecting sensor (hereinafter abbreviated to a sensor) 510 and a pen detecting circuit 520. Though a sectional view of the sensor 510 is omitted, the sensor 510 in the present example is formed by laminating a first conductor group 511, an insulating layer (not depicted), and a second conductor group 512 in order from a lower layer side. The first conductor group 511 is, for example, formed by arranging, in a Y-axis direction, a plurality of first conductors 511Y1, 511Y2, . . . , 511Ym (m is a positive integer) extending in a horizontal direction (X-axis direction) so as to be separated from each other at predetermined intervals and in parallel with each other. In addition, the second conductor group 512 is formed by arranging, in the X-axis direction, a plurality of second conductors 512X1, 512X2, . . . , 512Xn (n is a positive integer) extending in a vertical direction (Y-axis direction) orthogonal to the first conductor group 511 so as to be separated from each other at predetermined intervals and in parallel with each other.

The sensor 510 of the position detecting device 500 thus has a configuration for detecting a position indicated by the electronic pen 1E by using a sensor pattern formed by making the first conductor group 511 and the second conductor group 512 intersect each other. Incidentally, in the following description, when each of the first conductors 511Y1, 511Y2, . . . , 511Ym does not need to be distinguished, the conductor will be referred to as a first conductor 511Y. Similarly, when each of the second conductors 512X1, 512X2, . . . , 512Xn does not need to be distinguished, the conductor will be referred to as a second conductor 512X.

The pen detecting circuit 520 includes a selecting circuit 521 as an input-output interface with the sensor 510, an amplifier circuit 522, a band-pass filter 523, a detecting circuit 524, a sample and hold circuit 525, an analog to digital (A/D) converting circuit 526, and a control circuit 527.

The selecting circuit 521 selects one conductor 511Y or 512X from among the first conductor group 511 and the second conductor group 512 on the basis of a control signal from the control circuit 527. The conductor selected by the selecting circuit 521 is connected to the amplifier circuit 522. A signal from the electronic pen 1E is detected by the selected conductor, and is amplified by the amplifier circuit 522. The output of the amplifier circuit 522 is supplied to the band-pass filter 523, where only a frequency component of the signal transmitted from the electronic pen 1E is extracted.

The output signal of the band-pass filter 523 is detected by the detecting circuit 524. The output signal of the detecting circuit 524 is supplied to the sample and hold circuit 525 to be sampled and held in predetermined timing according to a sampling signal from the control circuit 527, and is thereafter converted into a digital value by the AD converting circuit 526. The digital data from the AD converting circuit 526 is read and processed by the control circuit 527.

The control circuit 527 operates so as to send out respective control signals to the sample and hold circuit 525, the AD converting circuit 526, and the selecting circuit 521 according to a program stored in an internal ROM. From the digital data from the AD converting circuit 526, the control circuit 527 calculates position coordinates on the sensor 510 which position coordinates are indicated by the electronic pen 1E. Further, the control circuit 527 detects the information on the forces in the respective directions of the three axes which forces are detected by the strain gauge 71 of the electronic pen 1E, and detects the identification information of the electronic pen 1E.

As described above, also in the electronic pen 1E according to the second embodiment, as in the foregoing embodiment, the electronic pen can be thinned. In addition, a force applied to the electronic pen 1E can be detected accurately.

Incidentally, while the above-described capacitive coupling type electronic pen sends out a signal from only the core body, a method of sending out the signal is not limited to this. For example, a sleeve provided on the pen tip side of the tubular casing of the capacitive coupling type electronic pen so as to surround the periphery of the core body can be formed by a conductor, and a signal can be sent out from the sleeve in place of the core body or together with the core body. In addition, the capacitive coupling type electronic pen may be configured to receive a signal from the position detecting device by one of the core body and the sleeve by capacitive coupling, perform amplification or the like of the received signal, and feed back the signal to the position detecting device from the other of the core body and the sleeve.

Other Embodiments or Modifications

[Modification of Core Body Portion Provided with Strain Gauge]

In the electronic pen 1 according to the foregoing first embodiment and the electronic pen 1E according to the second embodiment, the core body portion is constituted of the rod-shaped body portion and the strain generating body portion, and the force detecting sensor is formed by affixing or fixing the strain gauge to the strain generating body portion. In the force detecting sensors of the electronic pen 1 according to the first embodiment and the electronic pen 1E according to the second embodiment, the strain generating body portion is a disk portion integral with the rod-shaped body portion or separate from the rod-shaped body portion, and the force sensing portion of the strain gauge is affixed or fixed to one flat surface of the disk portion.

It is obvious that the configuration of this type of force detecting sensor is not limited to a configuration constituted of a rod-shaped body portion and a disk portion as in the foregoing embodiments.

Figure 11:
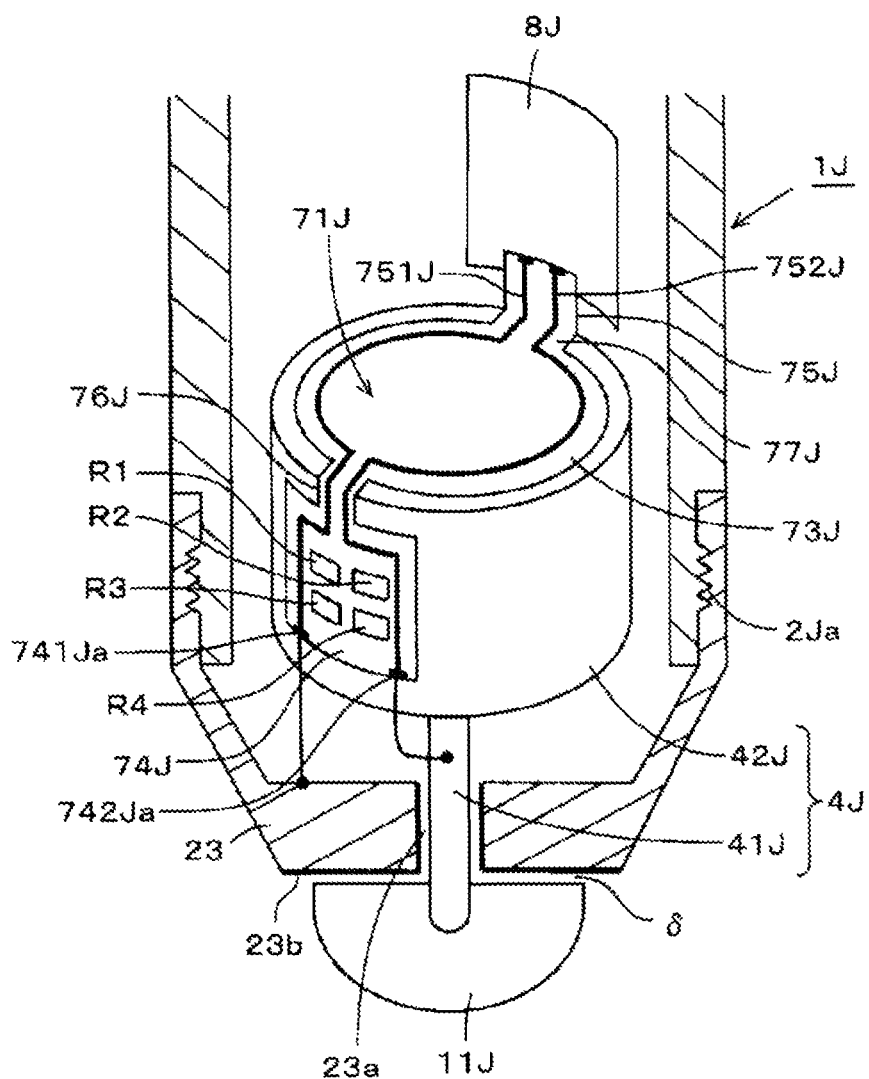
FIG. 11 is a diagram of assistance in explaining parts of an electronic pen according another embodiment to the present disclosure.

Example of Method of Sending Out Signal from Signal Generating Circuit in Active Capacitive Coupling Type Electronic Pen FIG. 11 is a diagram of assistance in explaining an example of a method of sending out a signal from a signal generating circuit in an active capacitive coupling type electronic pen. In an electronic pen 1J in the present example, a threaded portion 2Ja is formed on the pen tip side of a tubular case 2J, and a pen tip sleeve 23 formed by a conductor such, for example, as a metal or the like is provided in a state of being screwed on the threaded portion 2Ja. Because the pen tip sleeve 23 has conductivity, the electronic pen 1J in the present example is configured to be able to send out a signal also from the pen tip sleeve 23.

In the electronic pen 1J in the present example, a core body portion 4J includes a strain generating body portion 42J formed of a resin, for example, and a rod-shaped body portion 41J formed by a conductor such as a metal or the like. The rod-shaped body portion 41J is configured to protrude from an opening portion 23a provided in the pen tip sleeve 23 to the outside. A pen tip member 11J formed of a conductor is attached to a front end portion of the rod-shaped body portion 41J by, for example, screwing the pen tip member 11J onto the front end portion of the rod-shaped body portion 41J. In this case, because the rod-shaped body portion 41J and the pen tip member 11J each having conductivity and coupled to each other are configured to protrude from the opening portion 23a of the pen tip sleeve 23 having conductivity, an insulating film 23b as represented by thick lines in FIG. 11 is formed on each of a wall portion of the pen tip sleeve 23 which wall portion faces the rod-shaped body portion 41J and a wall portion of the pen tip sleeve 23 which wall portion faces the pen tip member 11J with a predetermined gap δ provided between the wall portion and the pen tip member 11J, and therefore the rod-shaped body portion 41J and the pen tip member 11J are electrically insulated from the pen tip sleeve 23. Alternatively, an insulating member having a shape similar to that of the formed insulating film 23b may be fitted onto the opening portion 23a of the pen tip sleeve 23. For example, a disk-shaped resin member including, as a central portion thereof, a tubular portion having an opening portion into which to insert the rod-shaped body portion 41J may be fitted as the insulating member into the opening portion 23a of the pen tip sleeve 23.

A strain gauge 71J constituted of a force sensing portion 73J and two extending portions 74J and 75J is attached to the strain generating body portion 42J of the core body portion 4J. That is, in the present example, the core body portion 4J and the strain gauge 71J constitute a force detecting sensor.

In the present example, as in the strain gauge 71 described with reference to FIG. 4, a coupling portion 76J and a coupling portion 77J configured such that the extending portion 74J and the extending portion 75J are easily bent with respect to the force sensing portion 73J is formed in the strain gauge 71J. In a state in which the extending portion 74J is bent at the part of the coupling portion 76J with respect to the force sensing portion 73J of the strain gauge 71J, the force sensing portion 73J is affixed or fixed to a bottom surface (flat surface) of the strain generating body portion 42J, and the extending portion 74J is affixed to a peripheral side surface (curved surface) of the strain generating body portion 42J. The strain gauge 71J is thereby affixed or fixed to the strain generating body portion 42J, as depicted in FIG. 11.

Though not depicted, strain sensitive elements X1, X2, Y1, Y2, Z1, and Z2 are provided to the force sensing portion 73J as in the foregoing embodiments, and circuit elements for constituting a bridge circuit as depicted in FIG. 5, for example, resistances R1, R2, R3, and R4 are provided to the extending portion 74J. That is, also in the strain gauge 71J in the present example, the bridge circuit depicted in FIG. 5 is formed on one insulative sheet so as to include the resistances R1, R2, R3, and R4.

In the present example, terminals A to H (not depicted in FIG. 11) provided to the strain gauge 71J supply a signal from a signal transmitting circuit (not depicted in FIG. 11) disposed on a printed board 8J to each of the pen tip sleeve 23 and the rod-shaped body portion 41J via conductor patterns 751J and 752J of the extending portion 75J.

The extending portion 75J is bent at the coupling portion 77J, and an end portion of the extending portion 75J is electrically connected to the printed board 8J by a lead wire, connector connection, or ACF compression bonding. Incidentally, in the present example, as depicted in FIG. 11, the conductor patterns 751J and 752J of the extending portion 75J are extended via the force sensing portion 73J, on which the strain sensitive elements X1, X2, Y1, Y2, Z1, and Z2 are arranged, and the extending portion 74J. Terminals 741Ja and 742Ja are formed in the extending portion 74J. The terminal 741Ja of the extending portion 74J which terminal is connected to the conductor pattern 751J is electrically connected to the pen tip sleeve 23 by a lead wire, for example, and the terminal 742Ja of the extending portion 74J which terminal is connected to the conductor pattern 752J is electrically connected to the rod-shaped body portion 41J by a lead wire, for example.

In the electronic circuit of the electronic pen 1J, the control circuit 82 monitors information from the strain gauge 71J, and when the pen tip member 11J of the electronic pen 1J is not in contact with the input surface of the position detecting sensor, the control circuit 82 performs control to send out a signal from the signal transmitting circuit 84 from the pen tip sleeve 23 and the rod-shaped body portion 41J or from the pen tip sleeve 23.

The control circuit 82 monitors the information from the strain gauge 71J, and when the pen tip member 11J of the electronic pen 1J is in contact with the input surface of the position detecting sensor, the control circuit 82 performs control to send out a signal from the signal transmitting circuit 84 from the rod-shaped body portion 41J and the pen tip member 11J without sending out the signal from the pen tip sleeve 23. Incidentally, the rod-shaped body portion 41J and the pen tip member 11J are a conductive central conductor that protrudes from a front end portion of the electronic pen to the outside and performs position indication.

Figure 12:
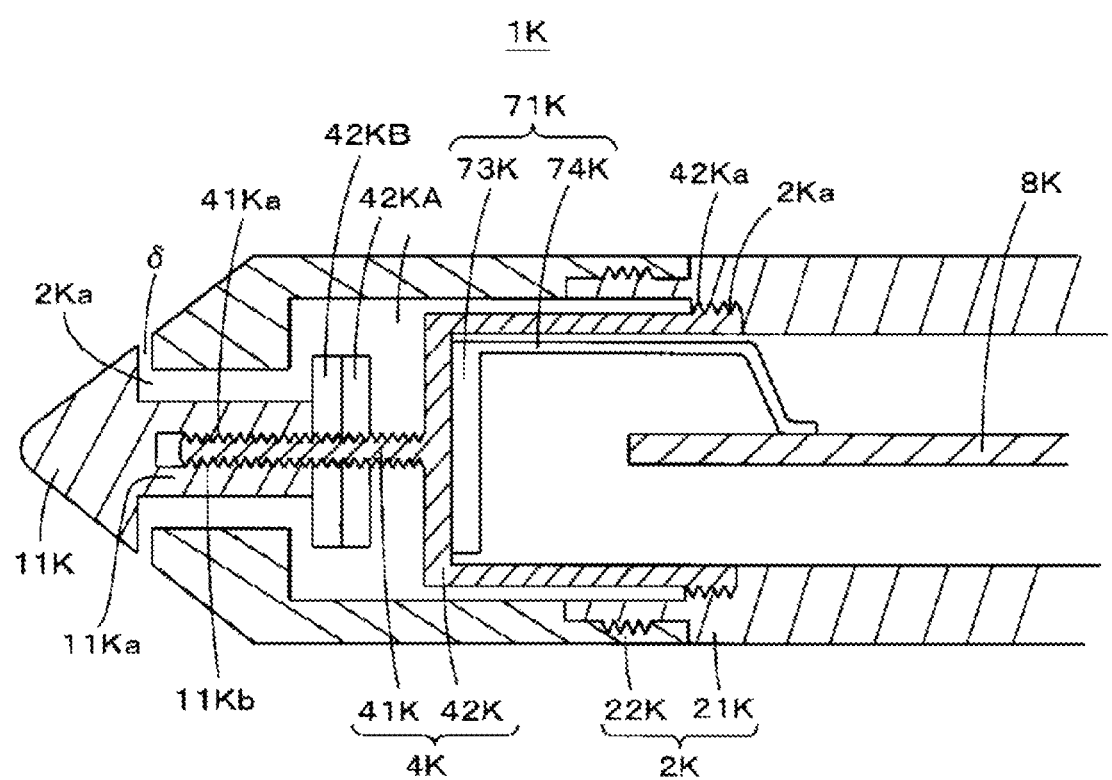
FIG. 12 is a diagram of assistance in explaining parts of an electronic pen according to yet another embodiment of the present disclosure.

Another Example of Configuration for Adjustment of Gap Between Pen Tip Member and Case FIG. 12 is a diagram depicting another example of the configuration for adjustment of the gap between the pen tip member and the case in the active capacitive coupling type electronic pen. A core body portion 4K of an electronic pen 1K in the present example is constituted of a threaded portion 41K for attaching a pen tip member 11K and a pen tip supporting portion 42K constituting a strain generating body portion. The threaded portion 41K and the pen tip supporting portion 42K in the present example are formed integrally with each other to constitute the core body portion 4K.

Two ring members 45KA and 45KB screwed on the threaded portion 41K of the core body portion 4K are provided as members for adjustment of a gap δ between the pen tip member 11K and a case 2K of the electronic pen 1K. The two ring members 45KA and 45KB have threads formed thereon so as to have different rotational directions in which the ring members are screwed onto the threaded portion 41K. That is, in a case where the ring member 45KA is configured to be moved to the pen tip supporting portion 42K side in a state of being screwed on the threaded portion 41K when rotated right, the ring member 45KB is configured to be moved to the pen tip supporting portion 42K side in a state of being screwed on the threaded portion 41K when rotated left. Therefore, when the two ring members 45KA and 45KB are rotated in directions opposite from each other and made to abut against each other, the two ring members 45KA and 45KB can be fixed at an arbitrary position in the axial direction of the threaded portion 41K.

On the other hand, the pen tip member 11K in the present example has, on an opposite side from the pen tip side, a projecting portion 11Ka including a threaded hole portion 11Kb screwed on the threaded portion 41K of the core body portion 4K. As depicted in FIG. 12, the threaded portion 41K on which the two ring members 45KA and 45KB are screwed in advance is screwed into the threaded hole portion 11Kb of the projecting portion 11Ka of the pen tip member 11K. The pen tip member 11K and the core body portion 4K are thereby coupled to each other.

Adjusting the fixed position of the two ring members 45KA and 45KB in the axial direction of the threaded member 41K determines to which position of the threaded hole portion 11Kb of the pen tip member 11K the threaded portion 41K can be screwed in. Hence, it is thereby possible to adjust the gap δ between the pen tip member 11K and the case 2K of the electronic pen 1K.

The case 2K of the electronic pen 1K in the present example is formed by screwing a pen tip side case 22K onto a tubular case main body 21K. A threaded portion 2Kb screwed onto a threaded portion 42Ka of the pen tip supporting portion 42K of the core body portion 4K is formed in a hollow portion of the case main body 21K. In addition, the pen tip side case 22K has an opening portion 2Ka formed therein in which a protruding portion of the pen tip member 11K in a state of protruding from the case 2K is located.

As depicted in FIG. 11, the pen tip supporting portion 42K of the core body portion 4K is of a structure having a tubular body whose inside is hollow, and has the configuration of a strain generating body portion that, when a pressure is applied to the pen tip portion 11K, produces a strain according to the pressure applied to the pen tip portion 11K. A strain gauge 71K is attached to a bottom surface of the hollow portion of the pen tip supporting portion 42K of the core body portion 4K. In the present example, the core body portion 4K and the strain gauge 71K constitute a force detecting sensor. The strain gauge 71K, for example, has a configuration similar to that of the strain gauge 71 according to the first embodiment. A force sensing portion 73K and one extending portion 74K of the strain gauge 71K are formed on one insulative sheet.

In this case, the strain gauge 71K is fixed to the pen tip supporting portion 42K by affixing the force sensing portion 73K of the strain gauge 71K to the bottom surface of the hollow portion of the pen tip supporting portion 42K. The extending portion 74K of the strain gauge 71K is connected to a printed board 8K by connector connection or ACF compression bonding, for example.

A pen module is constructed by fixing the strain gauge 71K to the pen tip supporting portion 42K of the core body portion 4K, connecting the printed board 8K to the strain gauge 71K, and screwing the pen tip member 11K onto the threaded portion 41K of the core body portion 4K, as described above. As depicted in FIG. 12, the pen module is fixed to the case 2K by inserting the printed board 8K into the hollow portion of the case 2K, and screwing the threaded portion 42Kb of the pen tip supporting portion 42K of the core body portion 4K into the threaded portion 2Kb formed within the hollow portion of the tubular case 2K of the electronic pen 1K. The pen tip side case 22K is thereafter screwed onto the case main body 21K. Then, finally, the pen tip member 11K is attached to the threaded portion 41K of the core body portion 4K by screwing the pen tip member 11K onto the threaded portion 41K of the core body portion 4K.

At this time, the predetermined gap δ between the pen tip member 11K and an end surface of the opening portion 2Ka of the pen tip side case 22K is adjusted by adjusting the fixed position of the two ring members 45KA and 45KB. When the gap δ is not appropriate, the pen tip member 11K is removed from the threaded portion 41K, the pen tip side case 22K is removed, and the fixed position of the two ring members 45KA and 45KB in the axial direction of the threaded member 41K is adjusted. Then, after the adjustment, the pen tip side case 22K is screwed onto the case main body 21K again, and the pen tip member 11K is thereafter attached to the member 41K for pen tip attachment by fitting the pen tip member 11K onto the member 41K.

Example of Configuration of Core Body Portion Provided with Shock Resistance

FIGS. 13A to 13D depict another example of the configuration of the core body portion that enables the strain gauge to detect a force applied to the pen tip. In the present example, the core body portion is formed so as to have shock resistance in particular. FIG. 13A is a plan view of a core body portion 4L in the present example as viewed from the pen tip side. FIG. 13B is a sectional view of the core body portion 4L.

As depicted in FIGS. 13A and 13B, the core body portion 4L in the present example is constituted of a core body main body portion 41L formed in a special shape so as to have shock resistance and a strain generating body portion 42L to which a strain gauge 71L is fixed.

FIG. 13C is a perspective view of the core body main body portion 41L constituting the core body portion 4L as viewed from a side of the core body main body portion 41L which side is coupled to the strain generating body portion 42L. As depicted in the sectional views of FIG. 13C and FIG. 13B, the core body main body portion 41L of the core body portion 4L in the present example is constituted of a base portion 412L having an external appearance in a rectangular parallelepipedic shape and formed such that a bottom surface side of the rectangular parallelepiped is hollowed out into a dome shape and thus has an arch structure and a rod-shaped body portion 411L formed so as to be planted from a central position of one surface (top surface) of the rectangular parallelepipedic shape of the base portion 412L in a direction orthogonal to the top surface. In the present example, the base portion 412L and the rod-shaped body portion 411L are formed integrally with each other. However, the base portion 412L and the rod-shaped body portion 411L may be separate parts coupled to each other.

The outside diameter shape of a cross section of the base portion 412L in the present example in a direction orthogonal to the axial direction of the rod-shaped body portion 411L is a square, and the cross-sectional shape of a cavity part 412La formed by hollowing out the base portion 412L into a dome shape is a circular shape. Hence, respective central portions of four sides on a bottom surface 412Lb side of the base portion 412L and vicinities of the central portions are thin-walled portions as depicted in FIG. 13C, and the base portion 412L has a structure such that the thin-walled portions on the bottom surface 412Lb side bend outward easily.

As described above, due to the presence of the cavity part 412La hollowed out and formed in a dome shape, the base portion 412L in the present example has an arch structure as depicted in FIG. 13D. Therefore, when a force in the axial direction as indicated by an arrow AR0 is applied to the rod-shaped body portion 411L as depicted in FIG. 13D, the force acts as a compressive force (force attempting to crush an object) on the base portion 412L. However, in the base portion 412L having the cavity part 412La hollowed out and formed in a dome shape and thus having an arch structure, the compressive force is converted into a tensile force (force attempting to stretch an object) as indicated by arrows AR1 on the bottom surface 412Lb side of the base portion 412L, as depicted in FIG. 13D. As described above, the bottom surface 412Lb side of the base portion 412L in the present example has a structure that easily bends in the direction of the tensile force, and therefore easily absorbs the tensile force.

Hence, the core body main body portion 41L in the present example has shock resistance to the compressive force applied to the base portion 412L through the rod-shaped body portion 411L.

The strain generating body portion 42L of the core body main body portion 41L in the present example is of a structure that can excellently receive a displacement of the base portion 412L of the core body main body portion 41L which displacement corresponds to the force applied to the rod-shaped body portion 411L. Specifically, as depicted in the sectional view of FIG. 13B, the strain generating body portion 42L is formed as a strain generating body portion formed by coupling two plate-shaped bodies 421L and 422L formed of a resin, for example, to each other such that the plate-shaped bodies 421L and 422L are opposed to each other in parallel, with a predetermined space interposed between the plate-shaped bodies 421L and 422L. As depicted in FIGS. 13A and 13B, eaves portions 423La, 423Lb, 423Lc, and 423Ld projecting in a side surface direction of the base portion 412L are formed on the plate-shaped body 422L on the base portion 412L side.

On the other hand, as depicted in FIGS. 13A, 13B, and 13C, projecting portions 413La, 413Lb, 413Lc, and 413Ld engaging with the respective eaves portions 423La, 423Lb, 423Lc, and 423Ld of the plate-shaped body 422L of the strain generating body portion 42L are formed on a side surface of the base portion 412L.

The core body main body portion 41L is coupled to the plate-shaped body 422L of the strain generating body portion 42L such that the projecting portions 413La, 413Lb, 413Lc, and 413Ld of the base portion 412L engage as depicted in FIG. 13B on the respective insides of the eaves portions 423La, 423Lb, 423Lc, and 423Ld of the plate-shaped body 422L. A bottom surface portion of the base portion 412L of the core body main body portion 41L and a surface of the plate-shaped body 422L of the strain generating body portion 42L are fixed to each other by being bonded to each other by an adhesive, for example.

Thus, a displacement (strain) corresponding to the tensile force occurring in the base portion 412L of the core body main body portion 41L according to the force applied as described above occurs in the plate-shaped body 422L and the plate-shaped body 421L of the strain generating body portion 42L. As depicted in FIG. 13B, the strain gauge 71L is attached to a surface of the plate-shaped body 421L which surface is on an opposite side from the plate-shaped body 422L side. Hence, in the present example, a force detecting sensor is formed by the core body main body portion 41L, the strain generating body portion 42L, and the strain gauge 71L.

As in the examples of the foregoing embodiments, the strain gauge 71L includes a force sensing portion 73L and an extending portion 74L. Though not depicted, a bridge circuit as depicted in FIG. 5 is formed by providing the strain sensitive elements X1, X2, Y1, Y2, Z1, and Z2 and wiring patterns on the force sensing portion 73L, and providing the resistances R1, R2, R3, and R4 and wiring patterns on the extending portion 74L. The strain gauge 71L is fixed to the strain generating body portion 42L by affixing the force sensing portion 73L to the above-described surface of the plate-shaped body 421L. In this case, the strain sensitive elements X1 and X2 and Y1 and Y2 of the force sensing portion 73L are attached such that a horizontal direction, for example, of the quadrangular surface of the plate-shaped body 421L is an X-axis direction, and such that a vertical direction of the quadrangular surface of the plate-shaped body 421L is a Y-axis direction.

According to the core body main body portion 41L to which the strain generating body portion 42L and the strain gauge 71L in the example of FIGS. 13A to 13D are attached, it is possible to detect information on forces in the respective directions of three axes of the force applied to the rod-shaped body portion 411L by the strain gauge 71L while having shock resistance.

OTHER MODIFICATIONS

Figure 14:
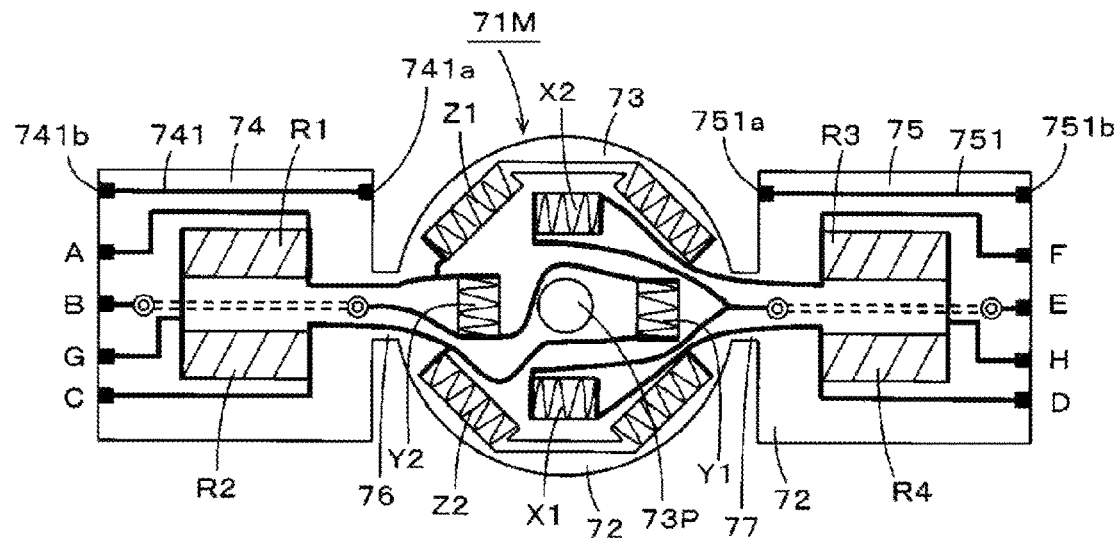
FIG. 14 is a diagram of assistance in explaining another example of a strain gauge used in an electronic pen according to an embodiment of the present disclosure.

Incidentally, a through hole may be provided in the center of the force sensing portion of the strain gauge. Specifically, a strain gauge 71M in the example of FIG. 14 represents an example in which a through hole 73P is formed in the center of the force sensing portion 73 of the strain gauge 71 in the example of FIG. 4. Incidentally, except for the through hole 73P, the strain gauge 71M in the example of FIG. 14 is precisely identical to the strain gauge 71 in the example of FIG. 4. Therefore, in FIG. 14, the same parts are identified by the same reference numerals as in FIG. 4. When a through hole communicating with the through hole 73P is provided also in the strain generating body portion to which the strain gauge having the through hole 73P as in the present example is fixed, a predetermined part can be inserted through the through hole 73P.

Figure 15:
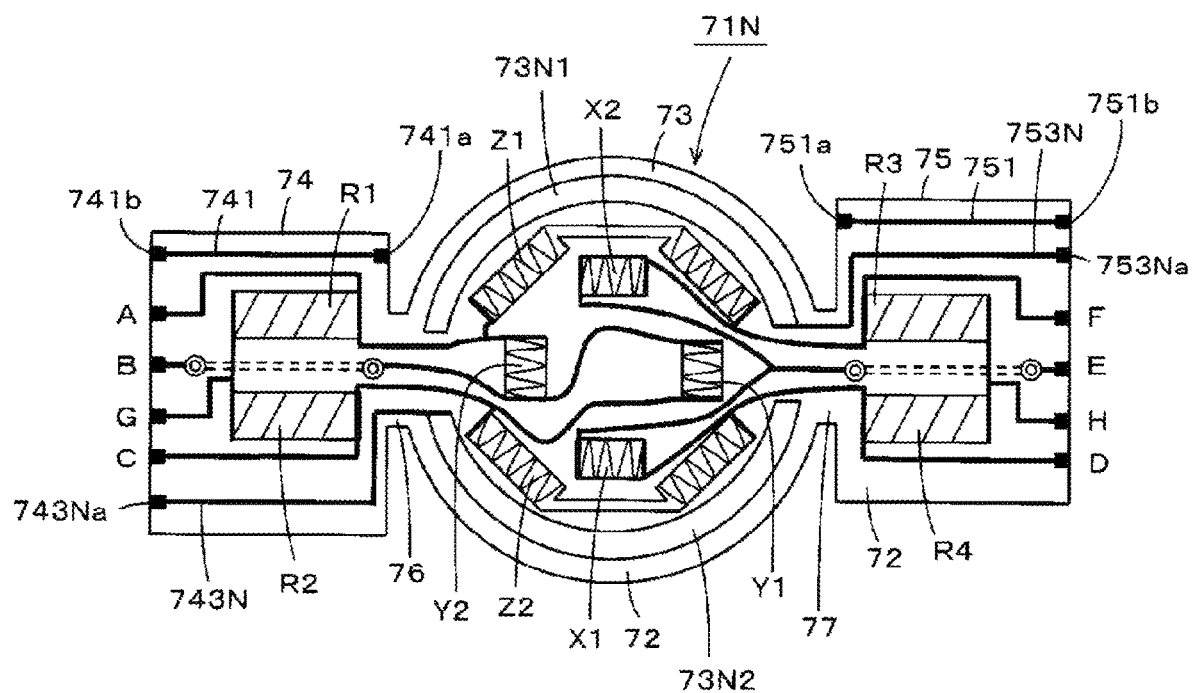
FIG. 15 is a diagram of assistance in explaining another example of a strain gauge used in an electronic pen according to an embodiment of the present disclosure.

Specifically, in a strain gauge 71N in an example of FIG. 15, semi-circumferential conductor patterns 73N1 and 73N2 are provided on the outside of the strain sensitive elements Z1 and Z2 of the force sensing portion 73. In the present example, the conductor patterns 73N1 and 73N2 are extended to form a conductor pattern 743N and a terminal 743Na on the extending portion 74 and form a conductor pattern 753N and a terminal 753Na on the extending portion 75. In this case, signals from the signal transmitting circuit are respectively supplied to the conductor patterns 743N and 753N through the terminal 743Na and the terminal 753Na.

Incidentally, in a case where the pen tip sleeve of the electronic pen is not formed by a conductor as in the example depicted in FIG. 11, conductor patterns similar to the patterns 73N1 and 73N2 may be formed on the pen tip sleeve that is not the conductor, and the conductor patterns may be used for signal transmission together with the conductor portion of the core body portion.

Incidentally, in the electromagnetic induction coupling type electronic pens according to the foregoing first and second embodiments, the coil wound around the magnetic core is disposed between the core body and the force detecting sensor in the axial direction of the electronic pen. However, the force detecting sensor can also be configured to be disposed between the core body and the coil wound around the magnetic core in the axial direction of the electronic pen.

Figure 3B:
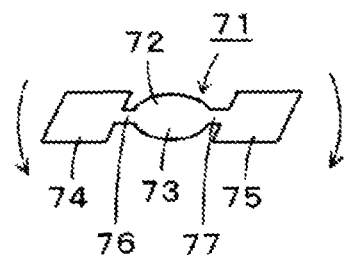
Figure 16:
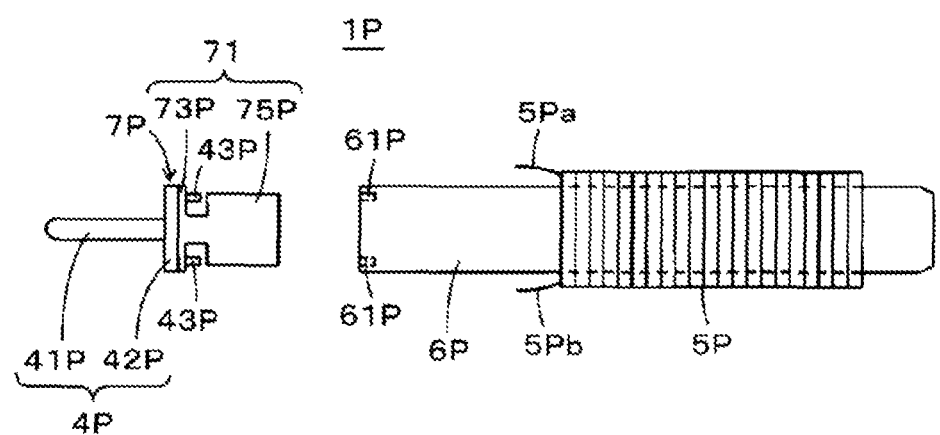
FIG. 16 is a diagram of assistance in explaining parts of an electronic pen according to yet another embodiment of the present disclosure.

FIG. 16 depicts parts of a thus configured electronic pen 1P. In the electronic pen 1P in the present example, as with the core body portion 4 of the first embodiment depicted in FIG. 3A, a core body portion 4P has a configuration formed by integrally coupling a rod-shaped body portion 41P and a disk portion 42P to each other. A strain gauge 71P of a force detecting sensor 7P which strain gauge has a configuration similar to that of the strain gauge 71 of the force detecting sensor 7 according to the first embodiment, the strain gauge 71 being depicted in FIG. 3B, is fixed to the disk portion 42P of the core body portion 4P as in the case of the core body portion 4 in the first embodiment. That is, the strain gauge 71P includes a force sensing portion 73P and extending portions 74P and 75P (only the extending portion 75P is depicted in FIG. 16), and the strain gauge 71P is attached to the core body portion 4P by fixing the force sensing portion 73P to a surface of the disk portion 42P which surface is on an opposite side from a side thereof coupled to the rod-shaped body portion 41P.

The disk portion 42P of the core body portion 4P is fixed and attached to an end surface of a magnetic core 6P wound with a coil 5P, the end surface being on the core body portion 4P side. In this case, a plurality of leg portions 43P are formed on a surface side of the disk portion 42P to which surface side the force sensing portion 73P is fixed, and a plurality of recessed holes 61P into which to fit the leg portions 43P of the disk portion 42P are formed in an end surface of the magnetic core 6P. The disk portion 42P of the core body portion 4P is fixed to the end surface of the magnetic core 6P by fitting the leg portions 43P into the recessed holes 61P, and bonding the disk portion 42P to the end surface of the magnetic core 6P by an adhesive.

At this time, the extending portions 74P and 75P of the strain gauge 71 are bent with respect to the force sensing portion 73P of the disk portion 42P, and are disposed along a side circumferential surface of the magnetic core 6P. Though not depicted in FIG. 16, both ends 5Pa and 5Pb of the coil 5P are connected to wiring patterns on the extending portions 74P and 75P of the strain gauge 71P. A bridge circuit and other wiring patterns are formed on the extending portions 74P and 75P as described above, and circuit parts formed on a printed board not depicted are connected to terminal portions of the extending portions 74P and 75P. In this case, both ends 5Pa and 5Pb of the coil 5P are connected to the printed board via the extending portions 74P and 75P.

As in the electronic pens according to the foregoing embodiments, the strain gauge 71P of the electronic pen 1P in FIG. 16 can also detect a pen pressure applied to the core body portion 4P together with the inclination of the electronic pen 1P.

Incidentally, the bridge circuit of the strain gauge depicted in the example of FIG. 5 is an example. It is obvious that the configuration of the bridge circuit of the strain gauge is not limited to the example of FIG. 5.

Incidentally, while the force detecting sensor is a three-axis sensor that detects pressures in three axial directions, that is, the X-axis direction, the Y-axis direction, and the Z-axis direction in the foregoing embodiments, the force detecting sensor may be a two-axis sensor, and a conventionally used pen pressure detecting sensor may be used for the Z-axis direction.

It is to be noted that the embodiment of the present disclosure is not limited to the foregoing embodiment, and that various changes can be made without departing from the spirit of the present disclosure.

What is claimed is:
1. An electronic pen comprising:
a tubular casing;
a core body disposed within the tubular casing in a state in which an end of the core body protrudes out of the casing from an opening in a side of the casing in an axial direction of the casing;

a plurality of strain sensitive elements;

a control circuit which, in operation, performs control based on a signal sensed using the plurality of strain sensitive elements; and a base material, wherein the base material is made by a bendable circuit board having a first portion and a second portion adjacent to the first portion, wherein the plurality of strain sensitive elements is arranged on the first portion of the base material within the tubular casing in a direction orthogonal to the axial direction of the casing and, in operation, receives a force applied by the core body, and wherein at least part of the control circuit is arranged on the second portion of the base material within the tubular casing in the axial direction of the casing and is electrically connected with the plurality of strain sensitive elements using electrical conductors formed on the base material.

2. The electronic pen according to claim 1, wherein:

each of a plurality of terminals of the plurality of strain sensitive elements and one of the electrical conductors is integrally formed.

3. The electronic pen according to claim 1, wherein:

an electronic circuit is disposed on the electrical conductors and is electrically connected to a plurality of terminals of the plurality of strain sensitive elements, and the electronic circuit, in operation, converts a strain sensed by the plurality of strain sensitive god into an electric signal.

4. The electronic pen according to claim 3, wherein:

the electronic circuit forms a bridge circuit together with the plurality of strain sensitive elements, and the electronic circuit, in operation, converts the strain sensed by the plurality of strain sensitive elements into the electric signal.

5. The electronic pen according to claim 3, wherein:

the electronic circuit includes at least an active element.

6. The electronic pen according to claim 3, wherein:

the electronic circuit includes at least a passive element.

7. The electronic pen according to claim 1, wherein:

the plurality of strain sensitive elements is fixed to a portion of the core body.

8. The electronic pen according to claim 1, wherein:

the plurality of strain sensitive elements is affixed to a portion of the core body.

9. The electronic pen according to claim 8, wherein:

the plurality of strain sensitive elements and the electrical conductors are arranged on the base material, and the electrical conductors are bent with respect to the plurality of strain sensitive elements and extend in the axial direction of the casing.

10. The electronic pen according to claim 1, wherein:

the strain sensitive elements are arranged so as to detect the force applied to the core body on at least one of three orthogonal axes.

11. The electronic pen according to claim 1, wherein:

the core body includes a strain generating body disposed within the tubular casing, the strain generating body having a planar portion formed in a direction orthogonal to the axial direction of the casing, wherein, in operation, a force applied to the core body is transmitted to the strain generating body.

12. The electronic pen according to claim 1, further comprising:

a coil and a magnetic core disposed within the tubular casing, the coil being wound around the magnetic core, and a position indicated by the core body being detectable based on an electromagnetic induction signal generated by the coil.

13. The electronic pen according to claim 1, further comprising:

a transmitting circuit which, in operation, supplies a signal to the core body, the core body having conductivity, and a position indicated by the core body being capacitively detectable based on the signal supplied by the transmitting circuit to the core body having conductivity.

14. The electronic pen according to claim 8, wherein the base material has a disk-shape and includes a strain generating body disposed within the tubular casing, the strain generating body having a planar portion formed in a direction orthogonal to the axial direction of the casing, wherein, in operation, a force applied to the core body is transmitted to the strain generating body.

15. The electronic pen according to claim 14, wherein the base material and the core body are formed integrally with each other.

* * * * *

UNITED STATES PATENT AND TRADEMARK OFFICE
CERTIFICATE OF CORRECTION

PATENT NO. : 11,079,863 B2  
APPLICATION NO. : 16/705098  
DATED : August 3, 2021  
INVENTOR(S) : Kazuo Hara et al.

Page 1 of 1

It is certified that error appears in the above-identified patent and that said Letters Patent is hereby corrected as shown below:

In the Specification

Column 29, Claim 3, Line 32:
"strain sensitive god into" should read: --strain sensitive elements into--.

Signed and Sealed this
Sixteenth Day of August, 2022

Katherine Kelly Vidal
*Director of the United States Patent and Trademark Office*